June 8, 1965     I. KAMLUKIN     3,187,821
TRACTOR AND POWER DRIVEN IMPLEMENT MOUNTED THEREON
Filed Aug. 8, 1960     12 Sheets-Sheet 1

Inventor
Igor Kamlukin

June 8, 1965     I. KAMLUKIN     3,187,821
TRACTOR AND POWER DRIVEN IMPLEMENT MOUNTED THEREON
Filed Aug. 8, 1960     12 Sheets-Sheet 4

Inventor
Igor Kamlukin

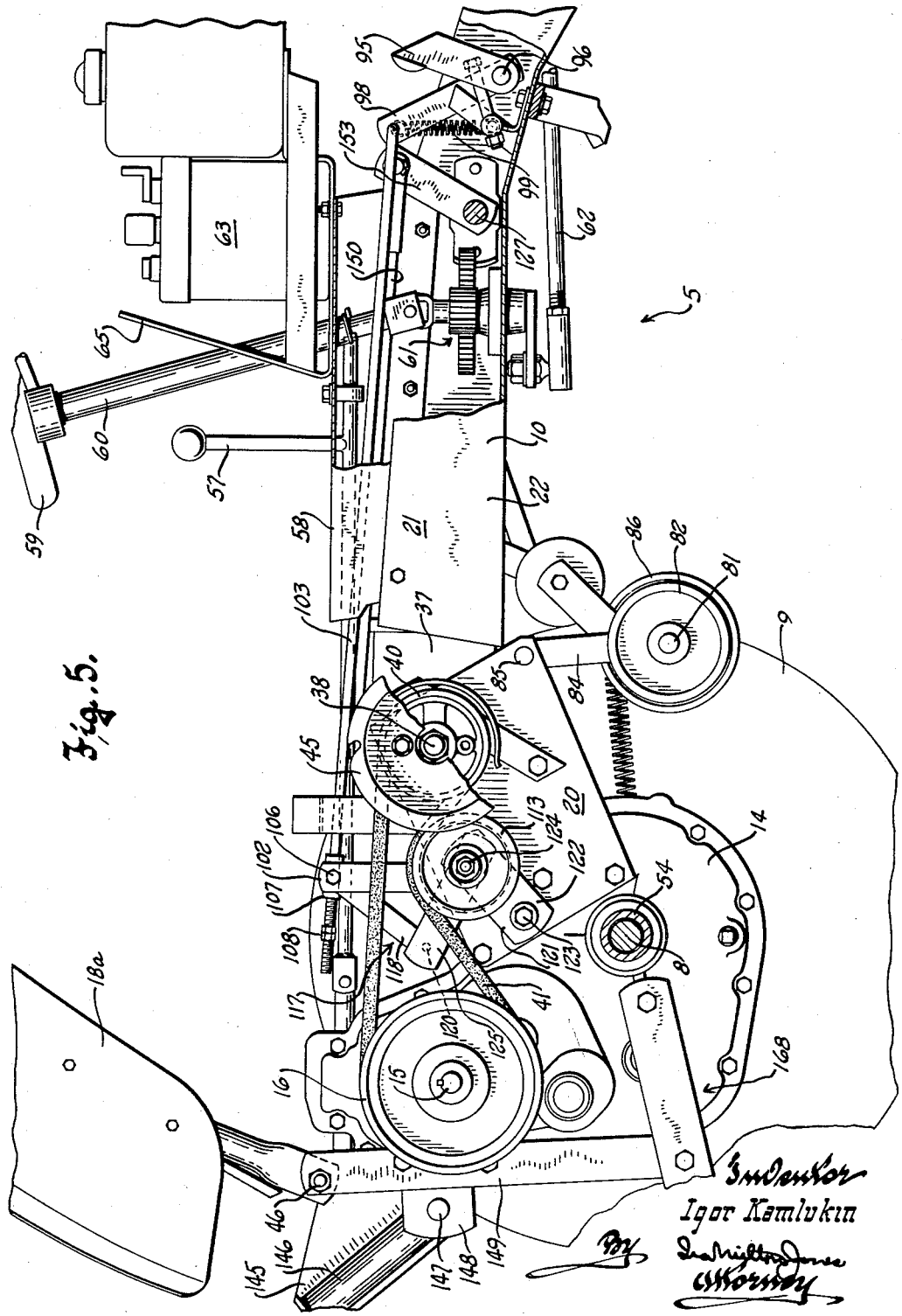

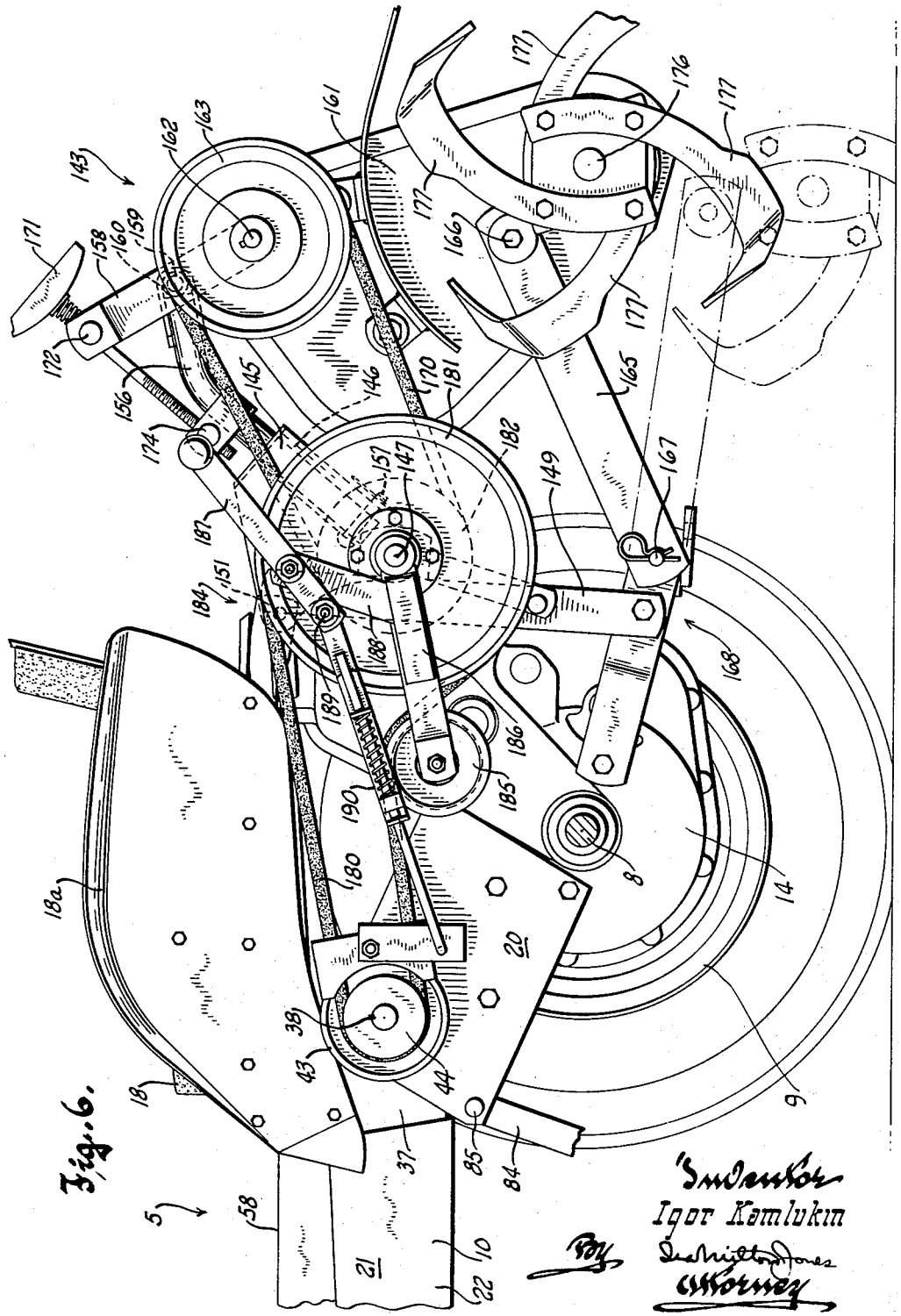

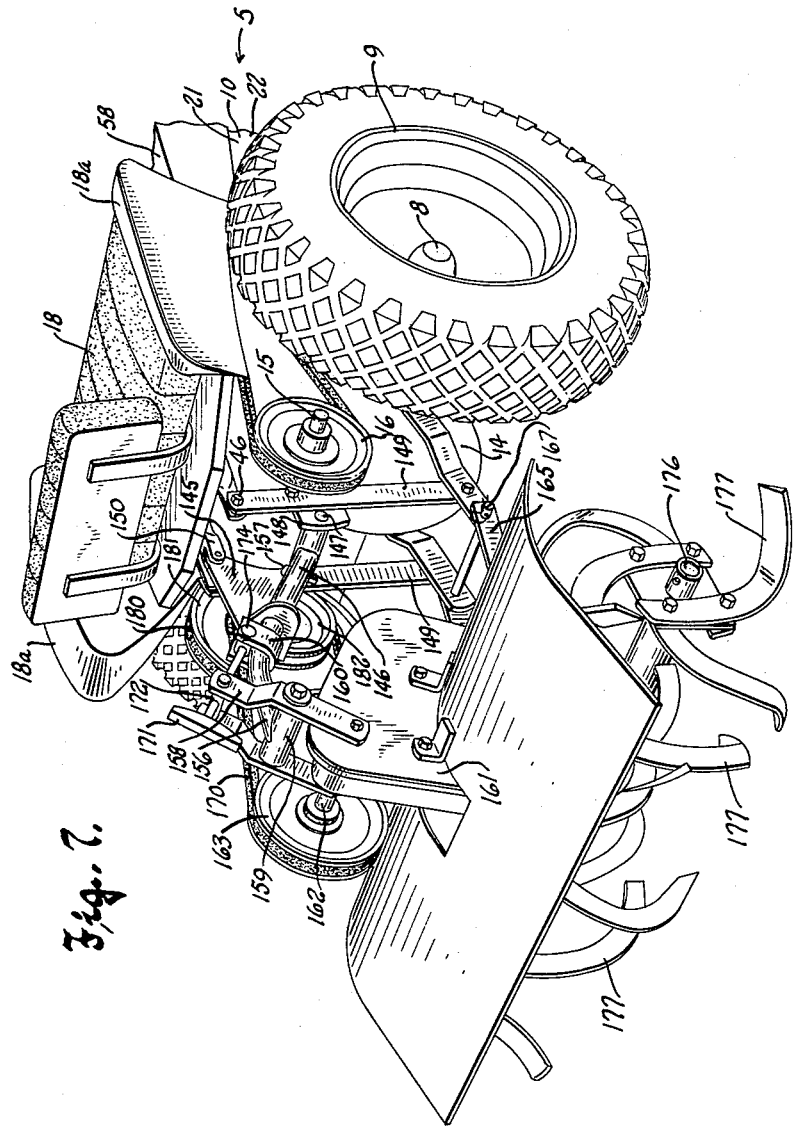

June 8, 1965
I. KAMLUKIN
3,187,821
TRACTOR AND POWER DRIVEN IMPLEMENT MOUNTED THEREON
Filed Aug. 8, 1960
12 Sheets-Sheet 8
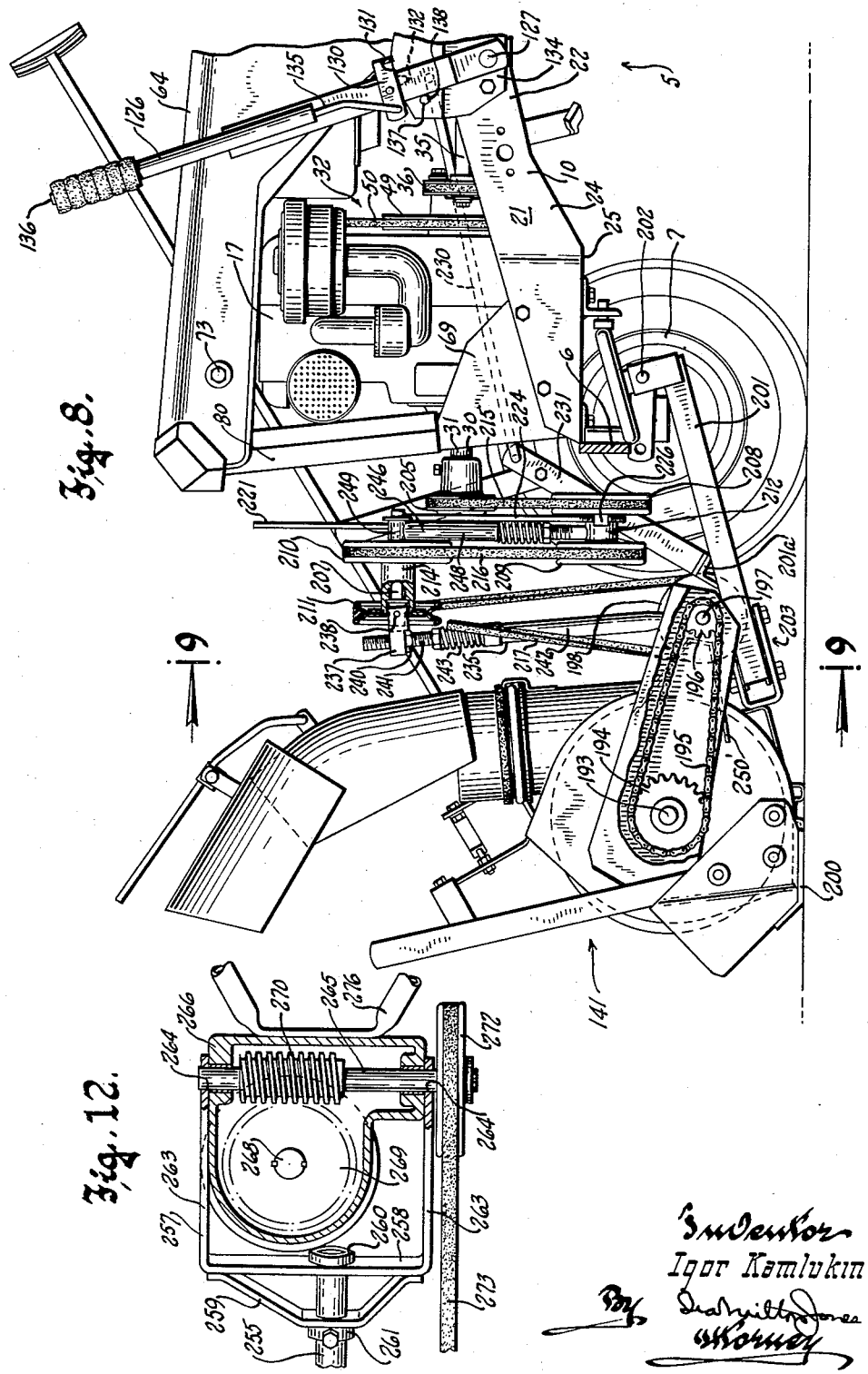

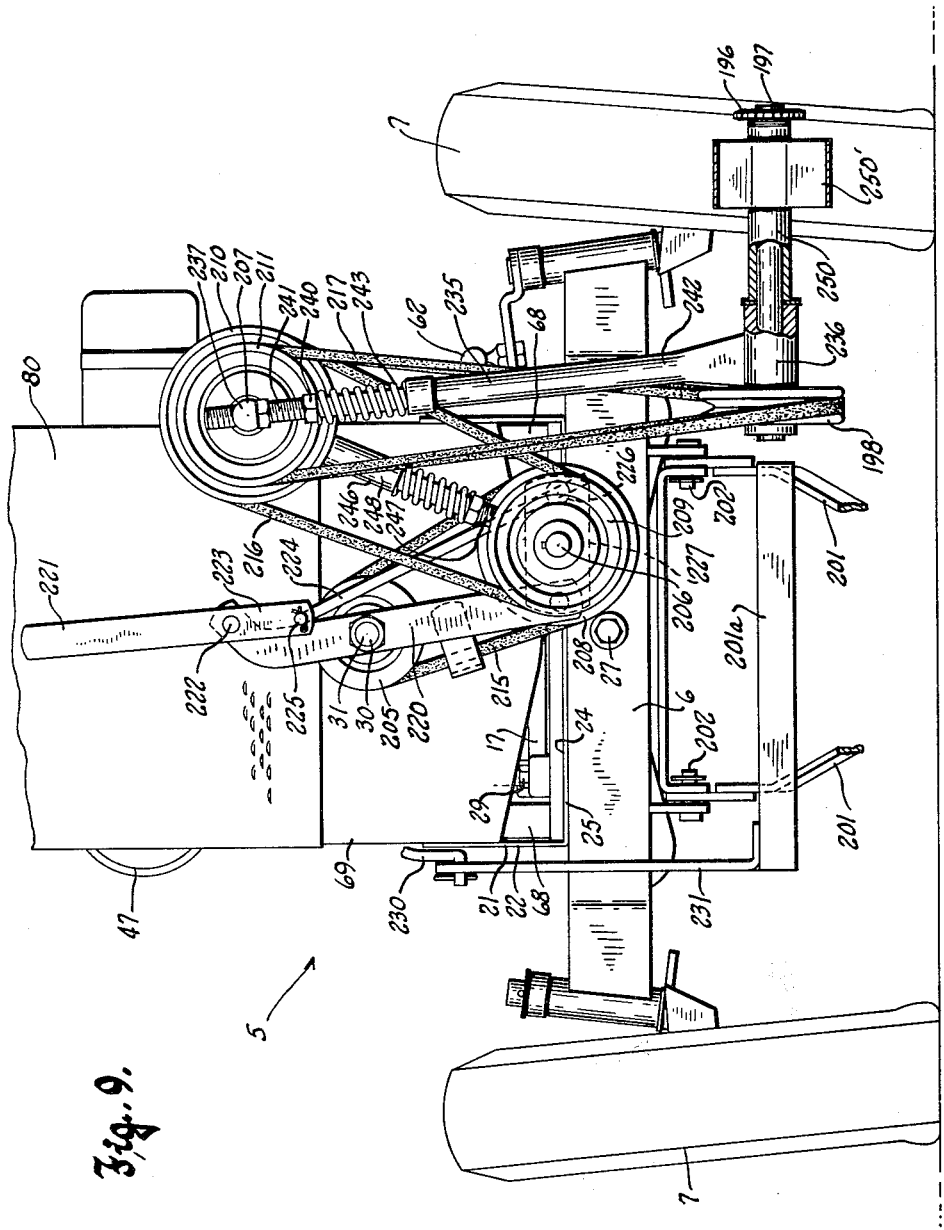

June 8, 1965
I. KAMLUKIN
3,187,821
TRACTOR AND POWER DRIVEN IMPLEMENT MOUNTED THEREON
Filed Aug. 8, 1960
12 Sheets-Sheet 10
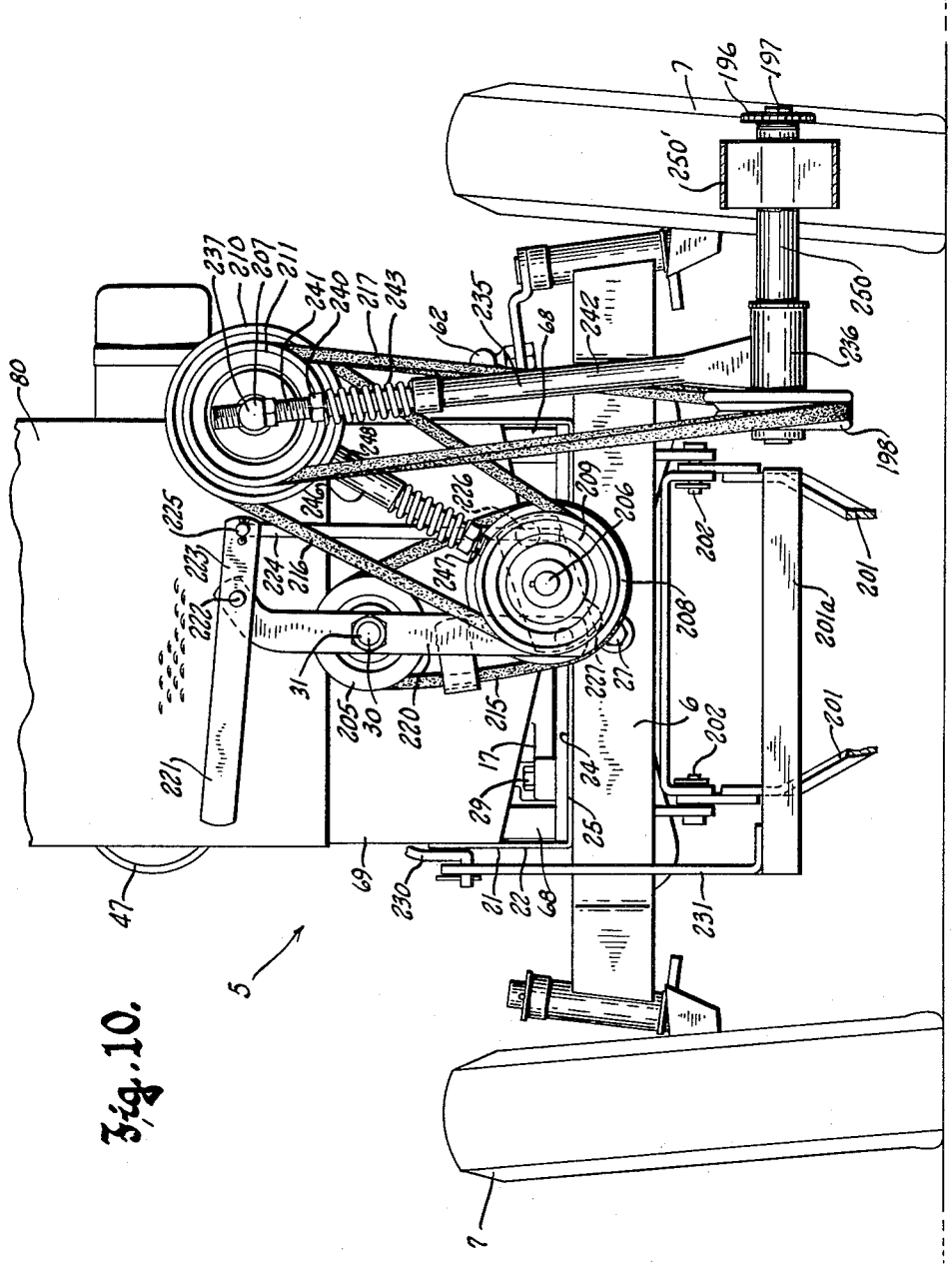

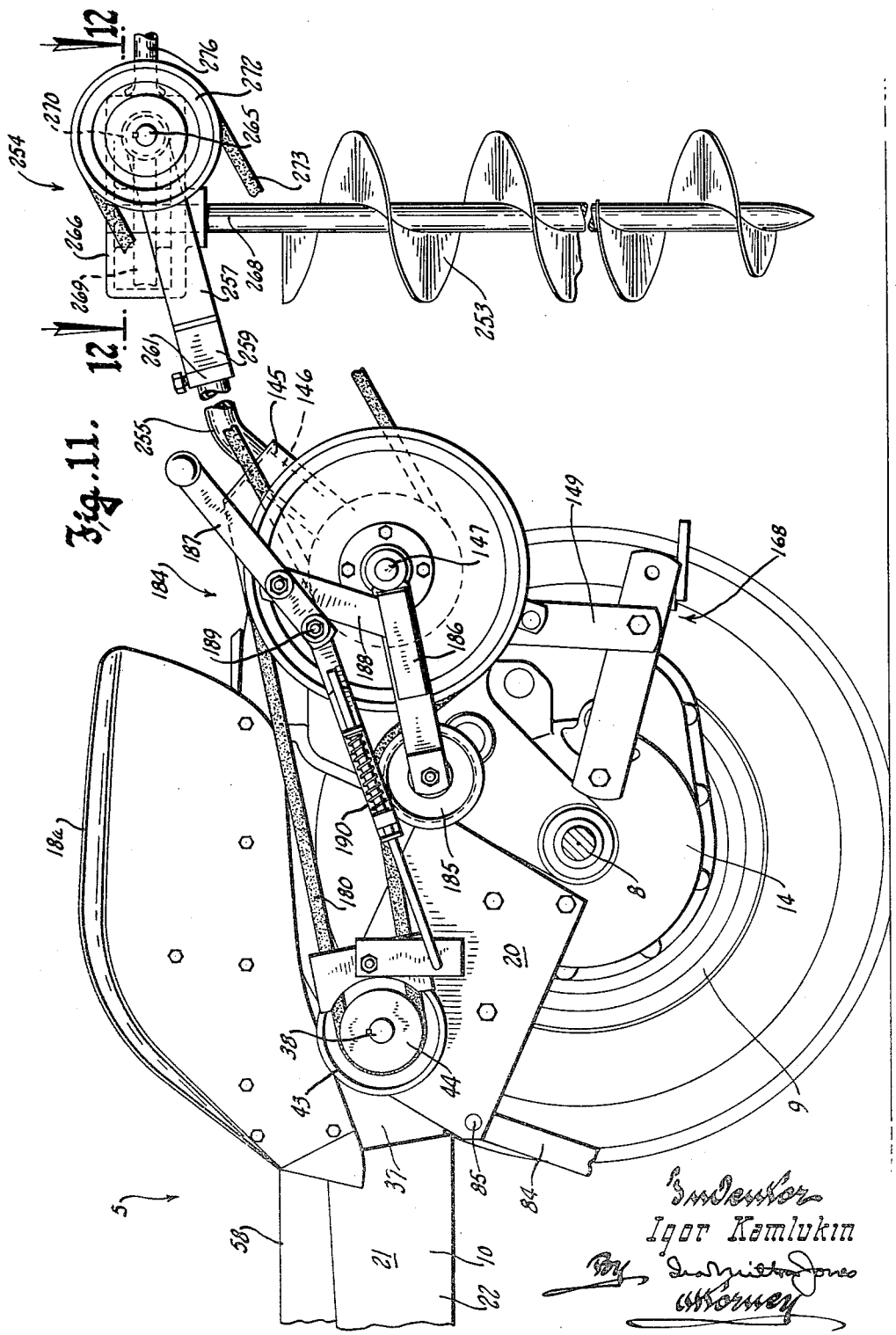

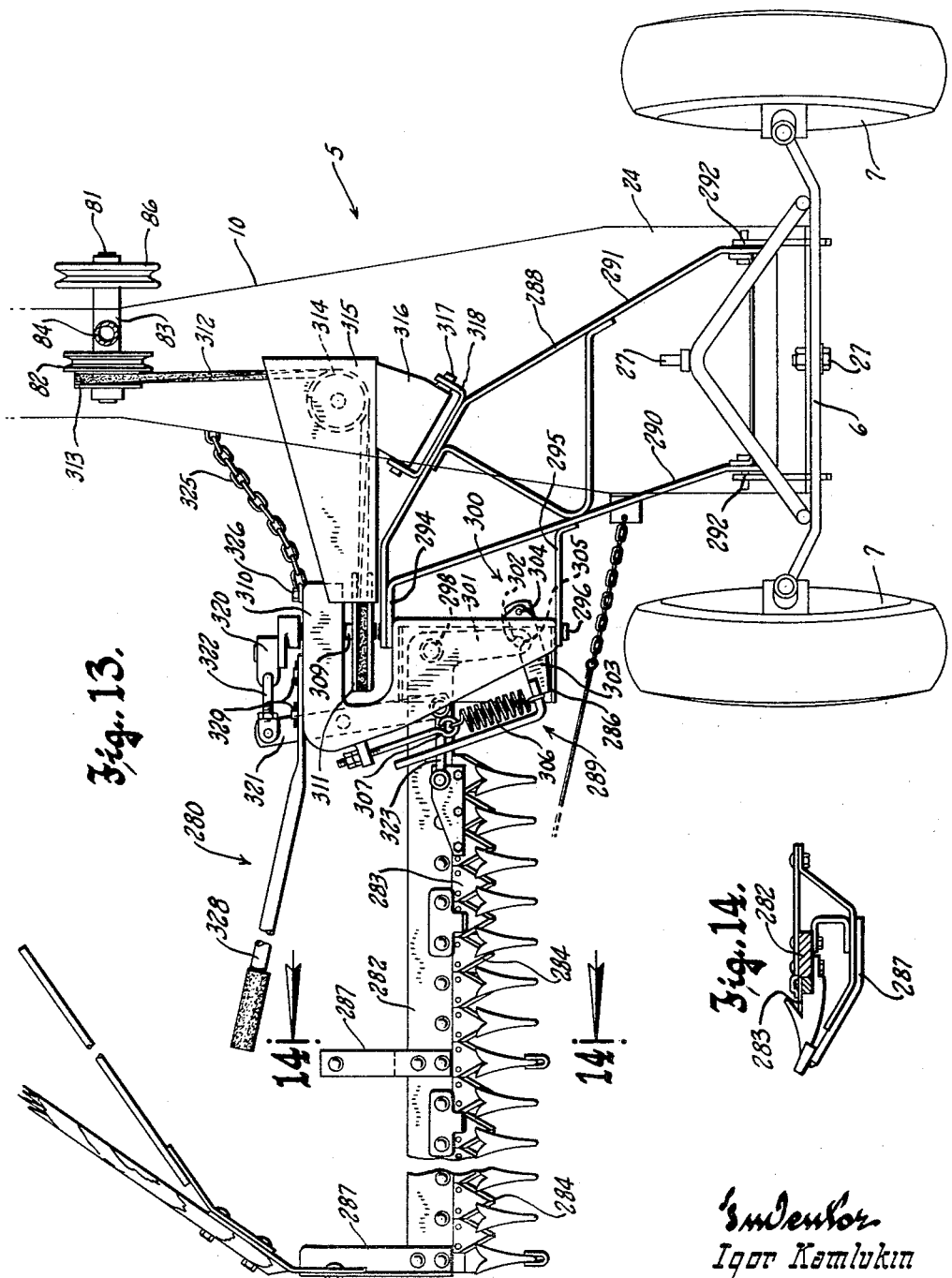

United States Patent Office 3,187,821
Patented June 8, 1965

3,187,821
TRACTOR AND POWER DRIVEN IMPLEMENT MOUNTED THEREON
Igor Kamlukin, Milwaukee, Wis., assignor to Simplicity Manufacturing Company, a corporation of Wisconsin
Filed Aug. 8, 1960, Ser. No. 48,239
7 Claims. (Cl. 172—103)

This invention relates to power driven lawn and garden equipment, and has more particular reference to improvements in tractors of the so-called riding type and power driven implements which may be mounted thereon and driven thereby.

One of the primary purposes of the invention resides in the provision of a power unit which is adapted to be coupled with lawn and garden equipment of the type having rotatable or otherwise movable work-performing instrumentalities which must be driven from the power unit.

From this it will be seen that it is one of the main objects of the invention to provide a power unit or tractor which is especially designed to be coupled with any of a wide variety of implements to provide both propulsion for such implements and a power source by which their rotatable or otherwise movable work-performing instrumentalities are driven.

Another purposes of the invention is to provide an improved tractor or power unit of the character described featuring longitudinal frame means which comprises a main frame member in the form of a channel having its flanges projecting upwardly, for maximum clearance beneath the frame member, and having a downwardly offset front portion in which an internal combustion engine which provides the power source of the tractor is nested to keep the weight of the engine low and as close to the front axle as possible, and wherein the upwardly offset medial portion of the channel-shaped main frame member houses a power shaft that is driven by the engine and which extends substantially horizontally rearwardly through said medial portion of the main frame member.

In this connection it is a further purpose of this invention to provide an improved power unit or tractor of the character described featuring a low mounted internal combustion engine at the front of the tractor, substantially over the front axle thereof, and transmission means located at the rear axle of the tractor for transmitting driving torque from the crankshaft of the internal combustion engine to the rear wheels of the tractor, and which transmission means has a housing that forms part of the main frame member.

Another and highly important purpose of the invention resides in the provision of a tractor or power unit of the character described having as it power source an air-cooled internal combustion engine mounted in the downwardly offset forward end of the frame channel, wherein the engine is so oriented as to be in a position substantially the reverse of what would normally be expected, namely, with the power take-off end of its crankshaft projecting forwardly and accessible at the front of the tractor, and its flywheel at the rear of the engine, so that the impeller blades on the flywheel blow cooling air forwardly across the engine and through a grille at the front of the tractor, rather than blowing heated air rearwardly toward the operator.

Still another purpose of the invention resides in the provision of a power unit or tractor of the character described having a main drive shaft which is carried by the frame means for rotation on a transverse axis adjacent to the rear of the main frame member and which is at all times drivingly connected with the internal combustion engine at the front of the tractor through an elongated power shaft that extends straight rearwardly from the flywheel end of the engine. In this connection, it is a more specific object of this invention to provide means on the main drive shaft to enable the internal combustion engine to be started, as by a rope trained over a drum on the main drive shaft, from a location a substantial distance rearwardly of the internal combustion engine.

Still a further object of the invention resides in the provision of an improved power unit or tractor of the character described wherein the transmission means at the rear of the tractor, by which the rear wheels of the tractor are driven, has an input shaft that is adapted to be drivingly connected with the main transverse drive shaft through a belt trained around pulleys on said shafts, and wherein a belt tightening mechanism provides for clutching and declutching the driving connection between the transverse drive shaft and the transmission.

A further object of the invention resides in the provision of an improved power unit or tractor of the character described, having several power take-offs located forwardly, rearwardly and at one side of the tractor, in such positions as to enable a wide variety of implements to be readily coupled to the tractor for travel therewith and to have rotatable or otherwise movable instrumentalities thereof drivingly connected with the power take-offs in such a manner that the driving connection to any such implement will not be affected by bodily movement of the implement relative to the tractor, and can be maintained when the implement is raised from its operative position, as well as when it is in its operative position, or, at the option of the operator, can be disrupted in any position of the implement.

Still another object of the invention resides in the provision of an improved power unit or tractor of the character described, having means for connecting various implements both to the front and to the rear of the tractor, which means enables the implements to be raised out of operating position by a unique lever and link system which provides for the counterbalancing of an implement at one end of the tractor by a weight attached to the implement attaching means on the other end of the tractor.

With the above and other objects in view which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 5 is an enlarged detail view of the rear portion of the tractor, taken substantially along the plane of the line 5—5 in FIGURE 3;

FIGURE 6 is an enlarged fragmentary view of the rear portion of the tractor, shown with a rotary tilling attachment connected thereto to convert the tractor into garden tilling apparatus;

FIGURE 7 is a perspective view of the garden tilling apparatus shown in FIGURE 6, as viewed from the rear thereof;

FIGURE 8 is a fragmentary side elevational view of the front portion of the tractor shown with a snow throwing unit coupled thereto and driven thereby so as to convert the tractor into a snow removing device;

FIGURE 9 is a front view of the snow removing device with the main portion thereof removed, and viewing the same generally along the plane of the line 9—9 in FIGURE 8, to illustrate the manner in which torque is transmitted from the front power take-off of the tractor to the rotor of the snow throwing unit;

FIGURE 10 is a view similar to FIGURE 9, but with the drive to the snow thrower rotor shown disengaged;

FIGURE 11 is a side view of the rear portion of the tractor showing a post hole auger attachment connected to the rear of the tractor and power driven therefrom;

FIGURE 12 is a sectional view taken on the plane of the line 12—12 in FIGURE 11;

FIGURE 13 is a more or less diagrammatic plan view of the front portion of the tractor chassis, illustrating how the tractor is converted into a power operated sickle bar mower; and FIGURE 14 is a sectional detail view taken on the plane of the line 14—14 in FIGURE 13, showing one of the shoes or skids for the sickle bar of the mower.

Figure 1:
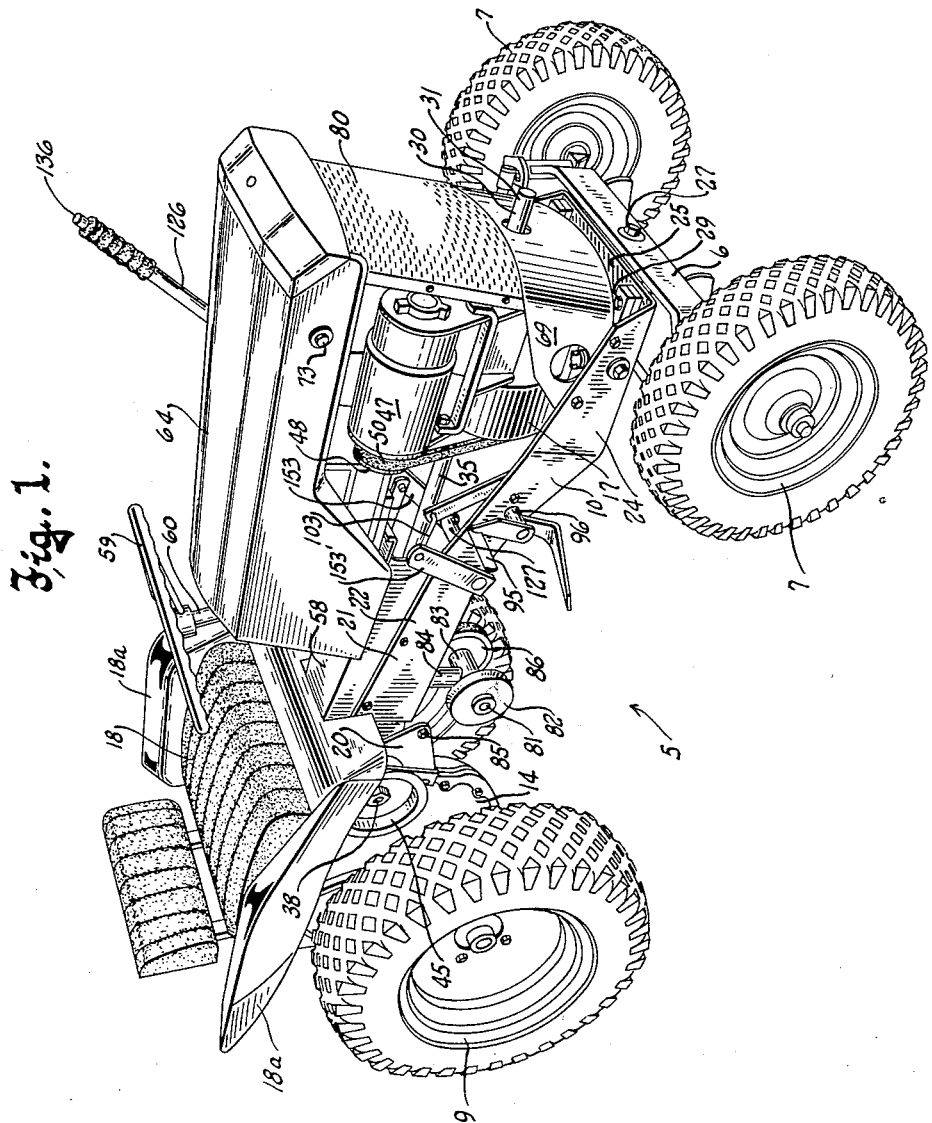
FIGURE 1 is a perspective view of the power unit or tractor of this invention, as seen from the front and one side.

Referring now more particularly to the accompanying drawings, the numeral 5 generally designates the chassis of the power unit or tractor of this invention, which is comprised of a front axle 6 having steerable wheels 7 at its ends, a rear axle 8 having larger drive wheels 9 on its opposite ends, and centrally disposed longitudinal frame means 10 connecting the medial portions of the front and rear axles to at all times maintain the same in an attitude normal to the length of the frame means and spaced apart a distance to accommodate a rotary lawn mowing device 12 between the front and rear wheels. The lawn mowing device 12 is shown, by way of example only, in FIGURE 2.

Mounted on the extreme forward end of the frame means is an internal combustion engine 17 which drives the tractor and powers the implements connected thereto. With the forward disposition of the engine described, an operator of the tractor may occupy a seat 18 mounted on the frame means 10 at the rear of the tractor, substantially directly above the rear axle 8. Fenders 18a extend outwardly and upwardly at the sides of the seat, over the rear wheels and serve as guards for belts 41 and 180 described hereinafter.

The frame means 10 comprises a channel-shaped main frame section 22 which extends from the seat 18 forwardly to the front axle 6, where it terminates a short distance above the front axle, and a transmission housing 14 mounted on the rear axle 18. The transmission housing is rigidly connected to the rear portion of the channel-shaped frame section 22 by means of a pair of opposite forwardly extending plates 20 secured to the transmission housing at their rear and affixed to the opposite upright side flanges 21 of the channel-shaped main frame section.

That portion of the frame section 22 which is located immediately ahead of the driver's seat 18 as at an elevation above both of the axles of the tractor, and substantially at the level of the tops of the smaller front wheels 7 of the tractor. About midway between the forward portion of the seat 18 and the front axle, the channel-shaped frame section 22 is bent downwardly to terminate in a downwardly offset and widened front end portion 24, the web 25 of which lies horizontally a short distance above the level of the front axle 6.

The front axle is connected to the downwardly offset front end portion 24 of the frame means by swivel joint means 27 which permit the front axle to have up-and-down rocking motion about a longitudinal axis substantially medially between the wheels 7 at its ends.

The internal combustion engine 17 is nested in the widened, downwardly offset front portion 24 of the frame means, between the flanges thereof, and rests upon and is secured to the web 25 of the channel as by means of bolts 29 passing through mounting ears on the base of the engine and through the web. The engine is so oriented as to have its crankshaft 30 disposed on an axis which extends longitudinally of the tractor and lies substantially midway between the side flanges 21 of the elevated portion of the channel-shaped frame section ahead of the driver's seat. It is important to note that the projecting portion of the engine crankshaft which would be considered its normal power take-off end 31 extends forwardly of the tractor to be accessible thereat as an implement drive power take-off, while the flywheel end 32 of the crankshaft faces rearwardly so that cooling air which is moved across the hot parts of the engine by impeller blades 33 on the flywheel is blown forwardly over the engine, away from an operator occupying the seat 18.

This forward disposition of the air-cooled internal combustion engine 17 is important for several reasons. It makes for good weight distribution, with the engine located close to and above the front axle 6 while the weight of the transmission 14 and the driver occupying the seat 18 are over the rear axle 8. It also facilitates the transmission of driving torque to the rear wheels by means which includes an elongated rearwardly extending torque shaft 35 disposed substantially coaxially with the crankshaft 30 and which connects the crankshaft with a main transverse drive shaft 38 journaled in a gear box 37 mounted on the frame means 10 beneath the driver's seat, between the plates 20 of the frame means.

Figure 3:
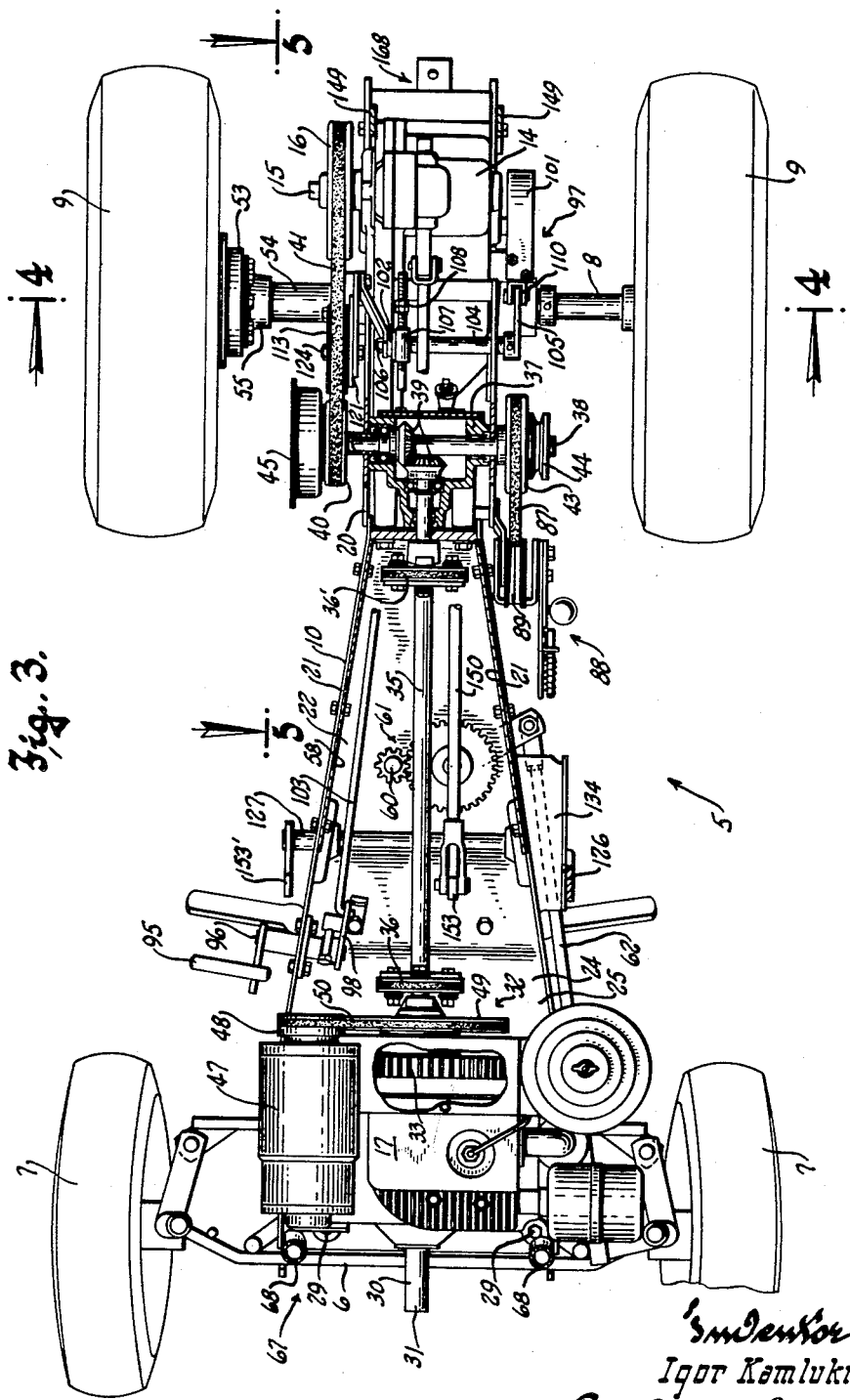
FIGURE 3 is a view, partly in plan and partly in longitudinal section, looking down upon the chassis of the tractor substantially along the line 3—3 of FIGURE 2.

The forward end of the torque shaft 35 is coaxially connected with the flywheel 32 of the engine by means of a flexible coupling 36, and a similar flexible coupling 36' intermediate the ends of the torque shaft, just ahead of the gear box, accommodates slight misalignments between the engine and the gear box. As best seen in FIGURE 3, the connection between the torque shaft and the main transverse drive shaft 38 comprises cooperating bevel gears 39 on said shafts, housed in the gear box 37.

The ends of the main transverse drive shaft 38 project to opposite sides of the frame means of the chassis, with one end of the drive shaft having a drive or output pulley 40 thereon. Journaled in the transmission housing 14 is an input shaft 15 having an input pulley 16 on one end thereof which aligns edgewise with the drive or output pulley 40 on the transverse drive shaft 38. A V-belt 41 encircling the pulleys 16 and 40 provides for drivingly connecting the torque shaft 35 with the transmission input shaft 15 so that driving torque can be transmitted from the internal combustion engine 17 to the rear wheels 9 of the tractor through the customary gearing 42 within the transmission housing.

The provision of the transverse drive shaft 38, at a location close to the rear axle of the tractor, is another important feature of the tractor of this invention. Its advantage resides in the fact that it is adapted to provide a power take-off from which driving torque can be transmitted to certain types of implements that may be coupled to the tractor. To this end the transverse drive shaft 38 may be provided, at its end remote from the output pulley 40, with a pair of power take-off pulleys 43 and 44. The transverse drive shaft 38 can also have a rope starter drum 45 secured thereto, adjacent to the output pulley 40, to facilitate starting of the internal combustion engine 17 from a location adjacent to the rear of the tractor. To provide access to the rope starter drum 45, the operator's seat 18 is supported from the chassis for upward and rearward swinging motion about a pivot 46 having a transverse axis behind the seat, out of its operative position (seen in FIGURE 2), to an elevated position (seen in FIGURE 5). It will be seen that the transverse drive shaft 38 can be used for the rope starter connection because of the fact that said shaft is at all times drivingly connected with the crankshaft of the engine.

If desired, automatic starting of the air-cooled internal combustion engine 17 can be provided for by means of a combination electric starter motor and generator 47 supported by the chassis in a position alongside the engine and having its drive pulley 48 drivingly connected, by means of a V-belt 50, with a larger pulley 49 which is connected with the flywheel end of the engine crankshaft. In order to permit the belt 50 to be trained about the pulleys 48 and 49, or to be removed therefrom whenever necessary, one or both of the flexible couplings 36 and 36' of the torque shaft 35 can be disassembled for either complete or partial removal of the torque shaft.

Figure 4:
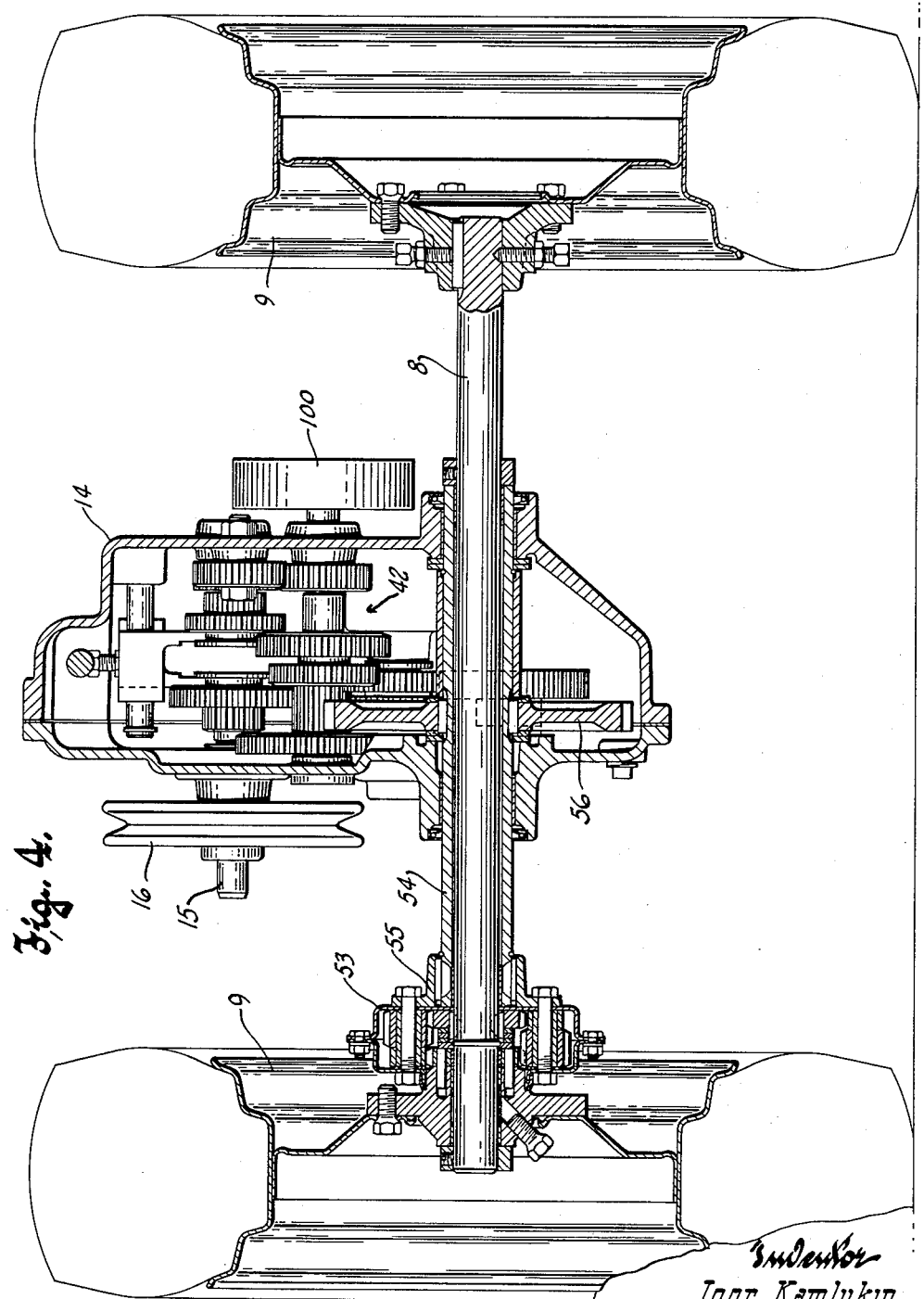
FIGURE 4 is an enlarged sectional view through the rear axle taken substantially along the plane of the line 4—4 in FIGURE 3.

The transmission and rear axle construction are substantially conventional. As best seen in FIGURE 4, the hub of one of the rear wheels 9 is fixed directly to one end portion of the axle shaft 8, and to the other end portion of said axle shaft is fixed one of the drive gears of a spur gear differential 53 mounted on the axle adjacent to the opposite rear wheel 9. The hub of the other wheel 9 is drivingly connected with the other drive gear of the differential in the customary manner. The transmission housing 14 is mounted upon an elongated sleeve 54, which freely rotatably receives the axle shaft 8 and is connected at one end to the end plate 55 of the spur gear differential to rotate therewith. The final or output gear 56 of the transmission is keyed to the sleeve 54 and may be considered as part of the differential gearing inasmuch as it is at all times drivingly connected, through the sleeve 54, with the end plate 55 of the differential housing.

The transmission provides three speeds forward and one in reverse for the tractor. Its gears are shifted by means which includes a shift lever 57 that projects upwardly through a cover 58 over the horizontal raised portion of the channel-shaped main frame section 23, so as to be easily accessible to an operator occupying the seat 18.

The tractor is also provided with steering gear, including a steering wheel 59 on the upper end of a steering column 60 which is operatively connected to the front wheels through gears 61 and linkage 62. The steering wheel 59, of course, is located ahead of the gear shift lever 57 so that it too is readily accessible to an operator occupying the seat 18.

Protection for the engine, the starter-generator 47, and a storage battery 63 from which the starting motor for the engine is energized, is afforded by means of a hood 64 in cooperation with an upright instrument panel 65 which is located a short distance ahead of the gear shift lever 57. The instrument panel, which is of substantially heavy gauge metal, is secured to the cover 58 over the raised medial portion of the chassis, and extends upwardly and at a slight forward inclination beneath the steering wheel 59, having a hole therein through which the steering column 60 extends. The instrument panel serves to mount the ignition switch, starter button, and such other instrumentalities as are commonly found on an instrument panel and may be necessary for the tractor of this invention.

The hood 64 is swingably supported from an upright frame at the front of the chassis, generally designated 67, which comprises a pair of rigid upright posts 68 joined at their upper ends by a rigid cross bar 70, and having their lower ends welded to a U-shaped plate 69 that extend around the front of the main frame member and is secured thereto. Each of the posts is provided, at a location just above the cross bar, with a pivot pin 71, the pins being located on a common transverse axis and arranged to pivotally support one end of a link 72 at each side of the frame. The opposite ends of the links 72 are pivotally connected to opposite upper side portions of the hood, adjacent to its front, as at 73, as by means of bolts which align on a common transverse axis. When the hood is in its closed position, shown in full lines in FIGURE 2, the links 72 extend rearwardly and slightly downwardly from the pivots 71, and as described hereinafter they permit the hood to be swung forwardly to the upright open position shown in construction lines in FIGURE 2.

When closed, the hood 64 extends a slight distance downwardly over the top of the upright frame 67, and extends rearwardly above the front of the main frame member over the engine, its gas tank and the battery 63. The hood also projects partway down at each side, especially at its rear, to substantially enclose the battery.

The upper edge of the instrument panel has notches 75 therein at transversely spaced locations, and a cross piece 76 projects downwardly from the rear end of the hood and has affixed to its lower edge portion a pair of rearwardly projecting studs 77 which are so located as to align with the notches 75 in the upper edge of the instrument panel. Washers 78, fixed on the studs at locations spaced from the rear surface of the cross piece, cooperate with the cross piece to define opposing shoulders between which the upper edge portion of the instrument panel is received when the hood is in its closed or down position, and the stud portions between these shoulders are then received in the notches 75 in the upper edge of the instrument panel.

The instrument panel has some degree of resilience which permits it to yield rearwardly, and it normally exerts a forward force on the hood to maintain the hood latched closed. When the hood is in its fully closed position, with the links 72 extending rearwardly and downwardly from the pivots 71, the axis of the pivotal connections 73 between the links and the hood lies in overcenter relation to and below a plane through the axis of the pivots 71 and the top of the instrument panel, to hold the hood latched to its closed position. When the front portion of the hood is lifted, the panel can yield rearwardly to some extent, permitting the pivot axis 73 to be carried upwardly through the plane just referred to, while the links 72 swing upwardly past a dead-center position aligned with said plane. Thereafter the cross piece can be released from the instrument panel and the hood can be moved forwardly, swinging the links 72 further upwardly about the axis of the pivots 71, until the rear end of the hood clears the steering wheel, whereupon the hood can be swung to its fully raised position shown in dotted lines. When the hood is lowered, this procedure is reversed, that is, the cross piece is first engaged with the upper edge of the instrument panel, and thereafter the hood is pressed downwardly near its front end to carry the pivotal link connections 73 downwardly through their overcenter positions.

The upright frame 67 at the front of the tractor also affords means for supporting a grille 80 in front of the internal combustion engine 17. This grille may be provided by a piece of expanded metal or other foraminous sheet material which extends between the posts 68 of the upright frame and has its opposite upright side edge portions fixed in any suitable manner to the posts. The medial portion of the grille may be bent forwardly to have a more or less convex shape, thus enhancing its appearance.

Figure 2:
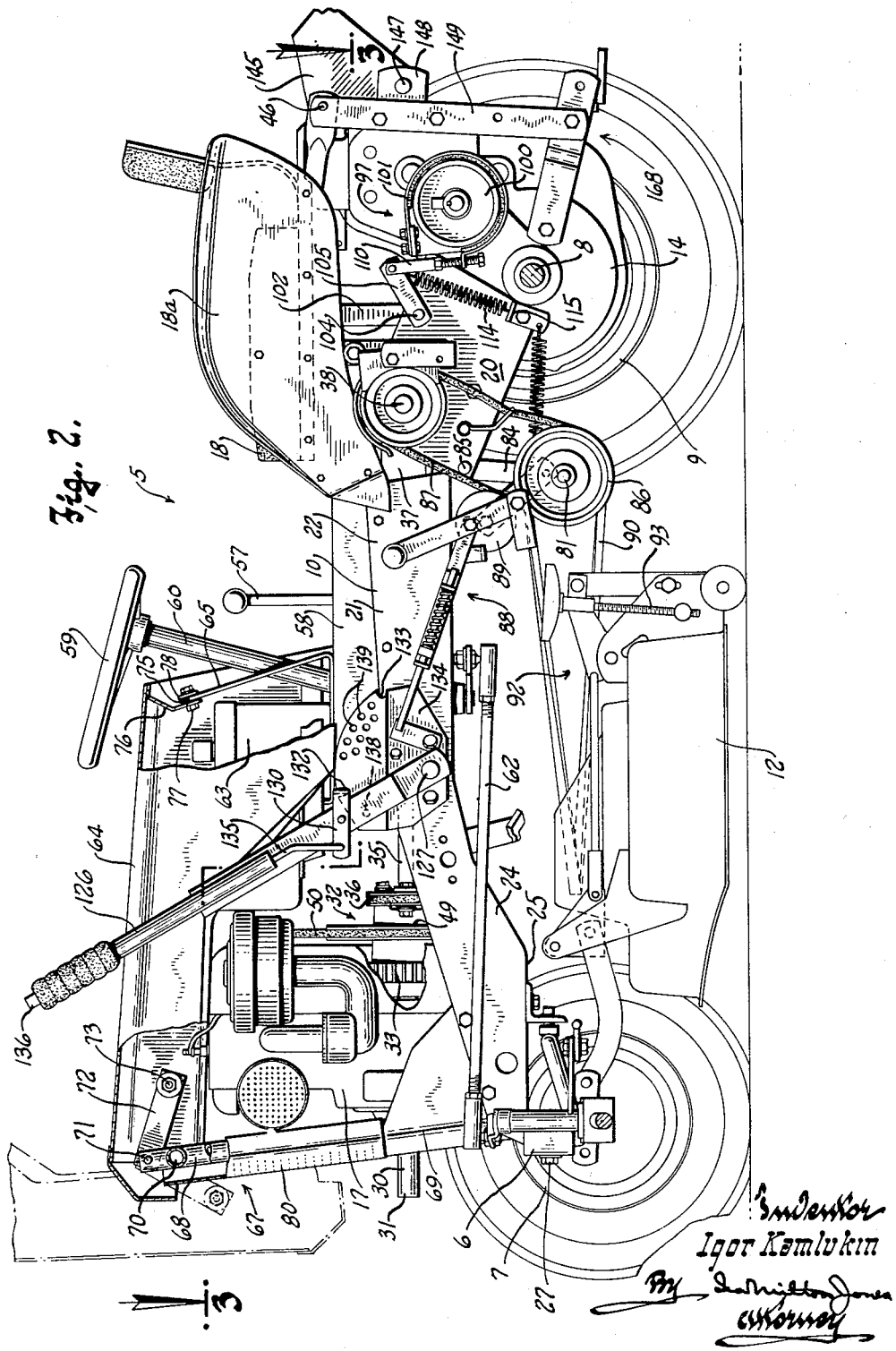
FIGURE 2 is a side elevational view of the power unit illustrated in FIGURE 1, with portions broken away to better illustrate the placement of the components of the power unit and other details of construction.

As indicated in FIGURE 2, the tractor is readily convertible to a power driven lawn mowing device of the riding type by the attachment of a rotary lawn mower 12 to the front axle of the tractor in the manner disclosed in Patent No. 2,924,928 issued to Igor Kamulkin and Nolan Rhoades on February 16, 1960. Similarly, the blades of the rotary lawn mower may be driven from a power take-off pulley 82 in the manner illustrated in the aforesaid patent. For this purpose a transverse bearing 83 is suspended by means of a tubular hanger 84 from a cross pin 85 having its ends anchored in the plate-like frame members 20, so that the bearing 83 can swing back and forth, about an axis which is parallel to but slightly below and forwardly of the main transverse drive shaft 38. The bearing 83 freely rotatably journals a shaft 81 having the power take-off pulley 82 secured to one end thereof and an input pulley 86 secured to its opposite end, so that the pulleys rotate in unison. A belt 87 is trained around the input pulley 86 and the output pulley 43 on the main drive shaft 38 and the driving connection through the belt can be engaged or disrupted, at the will of the operator, by means of a manually operable overcenter type shift mechanism 88 which comprises an idler pulley 89 that can be swung forwardly away from the belt 87, as seen in FIGURE 2, to disconnect the drive between the main transverse drive shaft 38 and the power take-off shaft 81, or can be swung rearwardly to an operative position at which it tensions the belt 87 into driving relationship with its pulleys 43 and 86. The power take-off pulley 82 on the power take-off shaft 81 is connectible by means of a quarter-twist belt 90 with the pulley (not shown) of the rotary lawn mower, so as to transmit rotation to the blades of the mower whenever the manually operable shift mechanism 88 is in an operative position.

The rotary lawn mower 12 is, in most respects, similar to that disclosed in the aforesaid Patent No. 2,924,928, except that it is provided with a lever and link system 92, controlled by a handscrew 93, by which the mower body can be translatingly adjusted either up or down, both during operation of the mower unit and when it is at rest, to provide for adjustment of cutting height.

A foot pedal 95 mounted on a stub shaft 96 in a flange at the front portion of the main frame member provides an actuating lever for controlling engagement and disengagement of the drive from the transverse drive shaft 38 to the input shaft 15 of the transmission. Also, when the foot pedal 95 is swung forwardly about the axis of the shaft 96 beyond the point where it effects disengagement of the transmission drive, it effects application of a brake 97, located at the side of the chassis remote from the input pulley of the transmission, and by which the rear wheels may be held against motion. The shaft 96 is keyed to the foot pedal and to an arm 98 which projects upwardly and slightly rearwardly from the shaft and which is biased to swing downwardly and rearwardly by means of a tension spring 99 connected between the upper end of the arm and an anchor on the web of the main frame member.

The brake comprises a brake drum 100 fixed to one of the shafts of the transmission 14 and a brake band 101 which can be tightened around the drum by means of a linkage connected with the foot pedal actuated arm 98 and which includes a lever 102 near the rear of the tractor and connected with the arm 98 by an elongated link rod 103, a shaft 104 to which the lever 102 is swingably secured, and a second lever 105 fixed to the shaft 104 and connected with the brake band.

The elongated link rod 103 is connected at its front end to the upper end of the combined brake and clutch arm 98, and it extends rearwardly through the closure provided by the channel-shaped medial section of the main frame member and its cover 58. The shaft 104, which carries the lever 102 to which the rear end of the link rod 103 is connected, is journaled for rotation about a fixed transverse axis in the opposite side plates 20 of the frame means. This location of the shaft 104 is a short distance behind the transverse drive shaft 38 and under the operator's seat 18. A swivel bolt 106 in the upper end of the lever 102 serves to mount a tubular bearing 107 on the lever for rocking motion about a transverse axis, and the rear portion of the link rod 103 is freely endwise slidably received in the bearing 107. A pair of lock nuts are threaded on the rear portion of the elongated link rod 103 to define an adjustable stop 108, and normally the tension spring 99 tends to hold the link rod in a rearmost position at which the stop is spaced a short distance behind the bearing 107. Consequently, if the foot pedal is depressed by an operator of the tractor, the arm 98 is swung forwardly a short distance before it brings the stop 108 on the rear of the link rod forwardly against the bearing 107 on the outer end of the lever 102. Further depression of the foot pedal causes the lever 102 to be swung forwardly to rotate the cross shaft 104 in a counterclockwise direction, as seen in FIGURE 2, and similarly impart counterclockwise motion to the second lever 105 fixed to the shaft 104 and projecting rearwardly therefrom. The rear end portion of the second lever 105 is connected with the live end of the brake band 101 by means of a link 110, so that such counterclockwise swinging motion of the lever 105 tightens the band 101 about the brake drum 100.

The initial motion of the brake pedal 95, which is permitted to occur before tightening of the brake band about its drum commences, is relied upon to effect disengagement of the driving connection between the output pulley 40 on the main transverse drive shaft 38 and the input pulley 16 on the transmission. This is accomplished by means of an idler or belt-tightening pulley 113 which is mounted for up-and-down motion, to and from a belt-tightening position (illustrated in FIGURE 5) in which it is normally held engaged under upward bias with the lower stretch of the belt 41. The belt-tightening pulley 113 is freely rotatably journaled on a bolt 124 or the like which is mounted in the elbow of a bell crank lever 121. The extremity of the lower arm 122 of the bell crank lever is carried on a pivot 123 which is secured in and projects from the side of the transmission housing 14, to mount the bell crank lever for swinging motion by which the belt-tightening pulley 113 is carried up and down. The upper arm 125 of the bell crank lever is connected with the swivel bolt 106 by means of a link 118, the upper end of which is pivoted on the swivel bolt and the lower end of which is connected with the extremity of the upper arm 125 of the bell crank lever by a pivot 120.

A substantially strong tension spring 114 has its lower end connected to the frame means, as at 115, and its upper end connected to the outer end of the lever 105 on the cross shaft 104. Bearing in mind that the levers 102 and 105 are both connected to the cross shaft 104 so that they are constrained to swing in unison about the axis of said shaft, it will be seen that the spring 114 tends to hold the brake released, and, through lever 102 and link 118, maintains a force upon the bell crank lever 121 that tends to hold the belt-tightener pulley 113 in its upward position in which it maintains the belt 41 in driving engagement with its pulleys 40 and 16.

With this arrangement, it will be seen that the elongated link 103 can be drawn endwise forwardly by the combined clutch and brake pedal 95 to cause the lever 102 to swing clockwise (as viewed in FIGURE 5) about the axis of its cross shaft 104, to also cause the bell crank lever 121 to rock in a clockwise direction about its pivot 123, thereby imparting downward belt loosening motion to the idler pulley 113 carried thereby. When the combined brake and clutch pedal is released by the operator, the spring 99 returns the pedal and the elongated link 103 to their rearmost positions, shown in FIGURE 5, and the tension spring 114 reacts through the lever and link system 117 to return the belt tightener pulley 113 to its operative position as shown in FIGURE 5.

At its side opposite the foot pedal 95, the tractor is provided with an elongated upwardly extending implement lift lever 126, the lower end of which is pivotally connected with the channel-shaped medial portion of the main frame means, as at 127, to provide for fore and aft swinging movement of the lift lever by which an implement connected with either the front or the rear of the tractor can be raised or lowered. In the present case, when the lever is moved toward its foremost position (shown in FIGURE 2), it moves an implement connected with the front of the tractor to a lowered or operative position or raises an implement connected to the rear of the tractor to an inoperative position. Similarly when the implement lift lever is swung to a rearmost position from that shown in FIGURE 2, it is adapted to hold an implement at the front of the tractor at an elevated inoperative position or to lower an implement connected with the rear of the tractor to its operative position.

The implement lift lever 126 is adapted to be releasably held in either of its extreme positions of motion by means of a medially pivoted latch 130 carried by the lever. At one end the latch 130 has a dog 131 that is selectively engageable in either a forward notch 132 or a rearward notch 133 in a sector-like plate 134 fixed to the side of the main frame member. The other end of the latch 130 is connected, by means of a rod 135, with a push button release 136 mounted in the grip portion at the top of the implement lift lever 126. When the push button 136 is depressed, the latch dog 131 is swung upwardly to disengage it from either of the notches 132 or 133 in the sector plate 134, freeing the implement lift lever for swinging motion either forwardly or rearwardly.

Depending upon the implement which is connected to either the front or the rear end of the tractor, the swinging motion of the implement lift lever may be limited, as suggested in FIGURE 8, by the engagement of the forward edge of the lift lever with a pin 137 engaged in a forward aperture 138 in the front portion of the sector plate 134, or by the engagement of the rear edge of the lift lever with a similar pin engaged in any one of a series of apertures 139 in the rear portion of the plate. As will be explained later, a pin is normally inserted in the aperture 138 whenever a snow thrower unit 141 is coupled to the front of the tractor and driven thereby, to limit the forward swinging motion of the implement lift lever and prevent the latch dog 131 from engaging in the forward notch 132, thus allowing the snow thrower to rise and descend as it accommodates itself to irregularities in a surface being cleared. Similarly, the engagement of the implement lift lever with a pin in any one of the holes 139 at the rear of the sector-like plate 134 prevents engagement of the dog on the latch lever 130 in the rear notch 133 whenever an implement such as a rotary tiller 143 is coupled to the rear of the tractor and driven thereby.

An implement mounting bracket 145, having an upwardly and rearwardly opening socket 146 therein, is pivotally mounted on the rear of the tractor for carrying a rotary cultivator, an auger or the like. As best seen in FIGURE 7, a pair of upright bars 149 at the rear of the tractor, secured to the transmission housing portion 14 of the frame means, have tabs 148 affixed to them in which are received the ends of a shaft 147 upon which the bracket 145 is pivotally mounted. The shaft 147 extends transversely to the tractor, and is located at a substantial elevation, approximately that of the operator's seat but behind the latter. Swinging motion is imparted to the bracket by means of a lever arm 153 which has its lower end affixed to the cross shaft 127 upon which the implement lift lever is mounted, and an elongated link 150 having its forward end pivotally connected to the upper end of the lever arm 153 (see FIGURE 5) and connected at its rear (see FIGURE 7) to the bracket 145 as by means of a pivot pin 151 extending through the link and the forward upper portion of the bracket. Thus, the fore and aft motion of the implement lift lever is translated into endwise motion of the link 150 to cause the implement mounting bracket 145 to swing up and down about its transverse pivot means 147.

The attachment of the rotary tiller to the rear of the tractor, as shown in FIGURES 6 and 7, by means of the bracket 145, converts the tractor into a power-operated tilling device. The tiller comprises a substantially flat upright transmission housing 161 disposed edgewise to the rear of the tractor and in which is journaled a transverse input shaft 162, the opposite end portions of which project from the housing, and a transverse rotor shaft 176, which likewise projects from opposite sides of the housing and carries a plurality of ground working tines 177. The rotor shaft is spaced below and slightly rearwardly of the input shaft, and is drivingly connected to the input shaft by transmission means (not shown) enclosed in the housing 161. When the tiller is coupled to the rear of the tractor, torque can be transmitted to a pulley 163 on the input shaft 162 of the tiller, from the pulley 44 on the transverse drive shaft 38, through intermediate implement drive means comprising pulleys 181 and 182 mounted on shaft 147, and belts 180 and 170.

The tiller is mounted on the tractor by means of a tubular arm 156 that forms part of the tiller and is adapted to have its forward end portion readily removably received in the socket 146 of the bracket 145 and secured in the socket by means of a pin 157. At its rear end, the arm 156 carries a pair of levers 158 which are medially pivoted upon a pintle 159 for swinging motion about a transverse axis, with one end of each lever extending upwardly and slightly forwardly and its opposite end extending downwardly and slightly rearwardly. The pintle 159 is received in a transverse tubular bearing 160 that is welded or otherwise affixed to the rear end of the arm 156, and the end portions of the pintle project from said bearing and carry the levers 158, so that the levers are held in parallel spaced apart relationship by the bearing 160. The lower end portions of the levers embrace the flat side walls of the transmission housing and are connected to said transmission housing by the input shaft 162 which freely rotatably passes through the lower ends of the lever arms 158. Consequently, it will be seen that the tiller is swingably suspended from the rear of the attaching arm 156 in such a way that the input shaft 162 can be moved back and forth, to effect tensioning and loosening of the belt 170 trained around the pulley 163 on said shaft and the intermediate implement drive pulley 182 mounted on shaft 147. The tiller is adjustably held in whatever position of swinging motion is required to effect tensioning or loosening of the belt 170 by means of a handscrew 171 constrained to rotation in a swiveled bearing 172 carried by the upper ends of the levers 158, between them. The lower end of the handscrew 171 is threaded into a nut 174 affixed to an intermediate portion of the attaching arm 156. Consequently, rotation of the handscrew 171 in one direction of the other effects either clockwise or counterclockwise movement of the lever arm assembly 158 about its axis 159, to carry the input pulley 163 of the tiller either toward or from the rear of the tractor. Since the bracket 145 is journaled in the same shaft 147 which carries the intermediate pulleys 181 and 182, it will be apparent that bodily up-and-down motion of the tiller about said shaft will not affect the tension of the belt 170.

Such bodily up-and-down motion of the rotary tilling attachment is guided by means of a link 165 having its rear end pivotally connected to the transmission housing of the tiller, as at 166, and having its forward end pivotally connected, as at 167, to a fixed portion of the tractor chassis at its rear, namely, the drawbar structure 168. In this manner, the link 165 cooperates with the suspension of the upper end of the tiller transmission to mount the tiller for translatory up-and-down motion due to the parallelogram arrangement of the connection points 147, 162, 166 and 167 between the rear of the tractor and the tiller attachment.

Rotation is transmitted from the output pulley 44 on the main drive shaft 38 to the intermediate pulley 182 by reason of the fact that pulley 182 is constrained to rotate with the implement drive pulley 181, which, in turn, is connected by the belt 180 with the output pulley 44. Preferably, the intermediate pulley 181 is larger than its companion pulley 182.

FIGURE 6 shows the tiller in an elevated transport position, in which it may be held by the implement lift lever 126 when the dog on its latch 130 is engaged in the forward notch 132 of the sector plate 134. When the dog is released, the tiller attachment can be lowered to bring its rotor into tilling engagement with ground to be worked. However, the dog should not be allowed to engage in the rear sector plate notch 133 in a manner which would lock the rotor of the tiller at a fixed working depth. This can be prevented by the insertion of a pin in one of the rear holes 139 in the secor plate, thus making it possible for the rotor to ride up over obstructions in the ground being tilled.

Mounted on the rear of the chassis is a manually operable overcenter type shift mechanism 184 by which the belt 180 can either be tensioned for driving relationship with the output pulley 44 and the implement drive pulley 181, or can be permitted to slacken and disrupt the driving connection between those pulleys. This mechanism comprises a bell crank having a forwardly extending arm 186 and an upwardly extending arm 188 and which is journaled at its elbow upon the shaft 147 that carries the implement drive pulley 181. At the outer end of the forwardly extending arm 186 of the bell crank, a belt-itghtening pulley 185 is freely rotatably carried for up-and-down movement toward and from tensioning engagement with the lower stretch of the belt 180. The upwardly extending arm 188 of the bell crank is pivotally connected at its upper end to the medial portion of an actuating lever 187. The free rear end portion of the actuating lever provides a hand grip, while its front end is connected, by a knee pivot 189, with the rear end of an elongated spring loaded expansion link 190. The front end of the expansion link is pivotally connected to a fixed part on the tractor chassis so that the expansion link cooperates with the actuating lever 187 in providing an overcenter mechanism which tends to carry the knee pivot 189 to one side or the other of a dead-center position in which the expansion member and the actuating lever are aligned with one another. Consequently, when the actuating lever is in its operative position shown in FIGURE 6, with its handle portion raised, the expansion link 190 of the overcenter mechanism maintains a rearward force on the upwardly extending arm 188 of the bell crank whereby the forwardly extending arm 186 tends to be swung upwardly about the shaft 147, to hold the belt-tightening pulley 185 firmly engaged with the lower stretch of the belt 180. When the handle portion of the actuating lever 187 is swung downwardly (i.e., clockwise), to bring the knee 189 of the mechanism upwardly across its dead-center position, the expansion link 190 exerts an upward force on the adjacent end of the actuating lever, which tends to swing the bell crank counterclockwise, thus carrying the belt-tightening pulley downwardly away from the belt 180.

The same mechanism that supports and drives the rotary tilling attachment described above can be employed to support and impart rotation to the auger 253 of a post hole drilling attachment 254 which is adapted to be mounted at the rear of the tractor. The auger attachment has an arm 255 which is adapted to have its forward end received in the socket of the pivoted bracket 145 on the rear of the tractor and which is more or less similar to the arm 156 on the rotary tilling attachment. However, as best seen in FIGURE 12, a substantially U-shaped frame 257 is rotatably mounted on the rear of the arm 255, as by having the rear of the arm 255 extend through a suitable hole in the bight portion 258 of the U-shaped bracket or frame. To steady the U-shaped frame on the arm 255, a reinforcing bar 259 is secured to the bight portion of the frame and has a medial portion which is offset forwardly of the bight of the frame and through which the rear end portion of the arm 255 also extends. A collar 260 secured to the rear extremity of the arm 255, at the inside of the U-shaped frame, cooperates with a second collar 261 which is secured on the arm ahead of the reinforcing bar 259 to preclude axial movement of the frame 257 along the arm without interfering with rotational or oscillatory movement of the U-shaped frame 257 about the axis of the tubular arm 255.

The opposite legs 263 of the U-shaped frame project rearwardly from its bight portion 258 and have holes 264 in their rear end portions that provide bearings in which a transverse input shaft 265 is freely rotatably received. This shaft also provides a support for a housing 266 into which the upper end portion of the stem 268 on the auger projects and in which it is rotatably journaled. Fixed to the end of the auger stem 268, inside the housing 266 is a worm wheel 269 which meshes with a worm 270 on the input or auger drive shaft 265. The drive shaft 265, of course, projects beyond one side of the frame 257 to have an input pulley 272 affixed thereto. A V-belt 273 trained around the pulley 272 and the output pulley 182 on the shaft 147, about which the pulley 182 rotates, provides for the transmission of rotation to the auger 253 from the transversely disposed main drive shaft 38.

With the construction of the auger described, it will be apparent that the stem 268, and the auger proper, can be swung from side to side about the rearwardly projecting end of the mounting arm 255. It can also, of course, be freely swung forwardly and rearwardly if the bracket 145 is permitted to swing about the shaft 147, as is possible so long as the latch dog 131 on the implement lift lever 126 is not engaged in one of the notches 132 or 133 in the sector plate 134. The provision of handles 276 affixed to the rear of the housing 266 enables an operator to easily swing the housing 266 and the auger carried thereby, with a universal swiveling motion, and hence the auger can be readily oriented in any desired direction during boring of a post hole thereby.

As indicated previously, the power unit or tractor of this invention can be converted to a snow removing device by the attachment of a snow removal unit 141 to the front of the tractor. The snow removal unit is of the type having a rotor that comprises blade means (not shown) mounted on a transverse shaft 193 having a sprocket 194 secured thereon. The rotor shaft 193 is driven by a chain 195 trained around its sprocket 194 and a sprocket 196 on a rotor drive shaft 197 that is carried by the snow blower unit for free rotation on a transverse axis parallel to that of the rotor shaft 193 but rearwardly thereof. Also fixed to the rotor drive shaft 197, inwardly of the sprocket 196, is an input pulley 198 through which driving torque from the crankshaft of the engine can be transmitted to the rotor drive shaft and hence to the bladed rotor of the unit.

The snow thrower unit, which may be of generally conventional construction, includes a pair of transversely spaced apart skids 200 which are adapted to engage upon the surface from which snow is to be removed. The housing structure of the snow thrower unit is connected with the tractor, to be propelled thereby, by means of a pair of rearwardly divergent push bars 201, the rear extremities of which are pivotally connected by pins 202 with the front axle of the tractor, the pins aligning on a common transverse axis parallel to the front axle. From the pins 202 the bars 201 extend forwardly beneath the front axle of the tractor, and there is a loose connection, indicated at 203, between the divergent forward ends of the bars 201 and the housing structure of the unit, whereby the bars support the unit for bodily up-and-down motion relative to the tractor and for slight relative tilting between the snow thrower unit and the front of the tractor.

Referring to FIGURE 8, it will be noted that the bars 201 couple the snow thrower unit to the front of the tractor in such a manner that the unit is disposed ahead of the tractor with its rotor drive shaft 197, and especially its input pulley 198, located substantially midway between the rotor shaft 193 and the front axle of the tractor.

Rotation is transmitted to the input pulley 198 on the rotor drive shaft from an output pulley 205 secured to the projecting front end portion 31 of the engine crankshaft 30, by means which allows both up and down bodily movement of the snow thrower unit 141 relative to the front of the tractor and tilting movement of the snow thrower relative to the front of the tractor, such as is produced when one of its shoes 200 rides up over ice or packed snow while the other remains engaged with the surface from which snow is to be removed.

The means for transmitting rotation from the engine crankshaft to the rotor drive shaft, and consequently to the bladed rotor of the snow thrower, is best seen by reference to FIGURES 8 and 9 and comprises a first countershaft 206 located beneath the projecting end of the engine crankshaft and the output pulley 205, and a second countershaft 207 located above the level of the engine crankshaft and at a distance to one side thereof, substantially over the input pulley 198 on the rotor drive shaft. Both of these countershafts are disposed with their axes parallel to that of the engine crankshaft, and they are supported in a unique fashion which allows them to move bodily relative to one another and to the axis of the engine crankshaft. Before describing the means by which the countershafts are so supported, it should be noted that each has a pair of V-belt pulleys thereon, which are constrained to rotate in unison, there being an input pulley 208 and an output pulley 209 on the first countershaft 206, and likewise an input pulley 210 and an output pulley 211 on the second countershaft 207. A V-belt 215 provides for driving connection of the power take-off pulley 205 on the engine crankshaft with the input pulley 208 on the lower countershaft; and another V-belt 216 provides for driving connection of the output pulley 209 of the lower countershaft with the input pulley 210 on the upper countershaft. A third V-belt 217 provides for driving connection of the output pulley 211 on the upper countershaft with the input pulley 198 on the rotor drive shaft 197.

The first countershaft 206 is freely rotatably received in a bearing-like sleeve 212 which extends axially between the pulleys 208 and 209, and said pulleys are fixed to the shaft 206 so as to rotate in unison. The pulleys 210 and 211 on the second countershaft 207 are fixed on the opposite ends of a sleeve 214 which is freely rotatable upon the shaft 207, and they are constrained by their securement to the sleeve 214 to rotate in unison with one another. As will be explained shortly, the second countershaft 207 does not rotate in the same fashion as the first countershaft 206.

The pulleys on the two countershafts are, of course, so arranged that the input pulley 208 on the lower countershaft is in edgewise alignment with the power take-off pulley 205 on the crankshaft, while the output pulley 209 on the lower countershaft, which is located a distance axially forwardly of the input pulley 208, aligns edgewise with the input pulley 210 on the upper countershaft. Similarly, the output pulley 211 on the upper countershaft is substantially directly over the input pulley 198 on the rotor drive shaft 197.

The bearing-like sleeve 212 which rotatably carries the lower countershaft 206 is swingably supported from the lower end of a lever or carrier 220, the medial portion of which is pivotally journaled on the forwardly projecting power take-off 31 of the engine crankshaft. Any suitable means of mounting the carrier or lever on the projecting front of the crankshaft may be provided, so as to enable the engine crankshaft to rotate freely while the lever remains more or less stationary in a nearly vertical position or swings from side to side about the crankshaft axis relatively to the front of the tractor.

The carrier or lever 220 forms part of a manually operable overcenter type belt-tightening and loosening device, by which the belt 215 connecting the power take-off pulley 205 with the input pulley 208 on the lower countershaft 206 may be either tightened into driving engagement with its pulleys, as shown in FIGURE 9, or loosened to disrupt the driving connection between said pulleys, as shown in FIGURE 10. For this purpose, an actuator 221 is medially pivotally connected, as at 222, to an offset upper portion of the carrier or lever 220, to swing relative to the lever about an axis parallel to that of the crankshaft. The upper end portion of the actuator forms a handle which is adapted to be grasped by an operator of the device, and it has a shorter portion 223 which extends below the pivot 222 toward the projecting front end of the crankshaft, the extremity of which is pivotally connected with the upper end 225 of a link or rod 224. The lower end of the rod 224 and the lower end of the actuator are pivotally connected with the opposite ends of an arm 227, which is freely rotatably mounted at its midportion upon the sleeve 212 in which the lower countershaft rotates. Preferably the rod 224 is connected to the lower end of the actuator 221 by having its upper end 225 bent from the rod proper and extending through a hole in the lower end of the short lower arm 223 of the actuator so as to provide the pivoted joint therewith. The lower end of the rod 224 is adjustably screw threaded into a stud 226 on the outer end of the arm 227. It will be seen that the arm 227 is more or less jointly supported by the rod 224 and the carrier or lever 220, to the lower end of which the inner end of the arm is pivotally connected, as at 228, and that the arm, which is disposed in a substantially horizontal position, cooperates with the lever 220 and the rod 224 in supporting the lower countershaft 206 from the front power take-off end portion 31 of the engine crankshaft, with the countershaft 206 disposed a distance beneath and slightly to one side of the engine crankshaft. It will also be seen that when the handle portion of the actuator 221 is swung counterclockwise, from the position shown in FIGURE 9 to the position shown in FIGURE 10, the arm 227 is carried upwardly by the rod 224, about its pivotal connection 228 with the carrier, to lift the first countershaft 206 and the input pulley 208 thereon toward the engine crankshaft and thus slacken the belt 215 to disrupt the driving connection between the engine and the snow thrower rotor. When the actuator is swung in the direction to carry it from the inoperative position shown in FIGURE 10 to the operative position shown in FIGURE 9, the outer end of the arm 227 is, of course, forced downwardly by the rod 224, until the rod and the actuator are in a dead-center position of alignment. A slight further motion of the actuator in the same direction engages the bent upper end 225 of the rod 224 against the adjacent side of the upper arm of the carrier or lever 220, to releasably lock the overcenter mechanism in its operative position in which it maintains the belt 215 in driving relationship with its pulleys, and wherein the tension of the belt holds the knee joint provided by the connection 225 at the actuator side of its dead-center position.

By reason of this arrangement, the overcenter linkage which supports the lower countershaft 206 may be regarded, when it is in its operative position shown in FIGURE 9, as a rigid triangle swingable back and forth bodily about the axis of the power take-off end 31 of the engine crankshaft. Such oscillatory motion of this rigid triangle structure actually takes place during operation of the snow removing unit, due to the up-and-down or "floating" motion of the latter as it rides up and over packed snow or ice, and also occurs at such times as the unit may be held in an elevated position by means of the implement lift lever 126 described previously. The lift lever is operatively connected with the unit by a second lever 153' on its cross shaft 127, and a rod 230 having its rear end connected to the lever 153' and its forward end connected with an upwardly and rearwardly extending arm 231 fixed to a rigid brace or crosspiece 201a that spans the divergent portions of the push bars 201 and is connected to them. In the forward position of the implement lift lever shown in FIGURE 8, the snow thrower unit 141 is, in a sense, self-supporting by reason of the engagement of its shoes 200 with the surface from which snow is to be removed. It is for this reason that the implement lift lever cannot have the dog on its latch arm 130 engaged in the forward notch 132 of the sector-like plate 134 when the snow thrower unit is connected to the front of the tractor; and to prevent such engagement a pin 137 is inserted in the foremost one of the holes in the sector-plate to limit the forward swinging motion of the implement lift lever, as indicated in FIGURE 8.

In order to maintain the belts 217 and 216 in driving engagement with their respective pulleys during operation of the snow thrower unit, despite up and down movement of the unit relative to the tractor, spring loaded expansion links 246 and 235 are provided to connect the opposite ends of the upper countershaft 207 respectively with the lower countershaft 206 and with the rotor drive shaft 197. The longer one 235 of the spring loaded expansion links comprises a stem 241 which has its lower end portion telescopingly received in a tubular lower link member 242, and a compression spring 243 which reacts between the stem and the tubular member. Affixed to the lower end of the tubular member 242 is a transverse sleeve 236 which freely encircles a portion of the rotor drive shaft 197 adjacent to the input pulley 198 thereon. The upper end of the stem portion 241 of the expansion link 235 has a screw threaded connection with a knuckle 237 that is connected to a bifurcated forward extremity of the upper countershaft 207 by a pin 238 which extends transversely through said countershaft and is disposed on a horizontal axis, so that the knuckle 237 can have a limited degree of up-and-down swinging motion relative to the upper countershaft. The screw threaded connection between the upper end of the expansion link and the knuckle 237 provides for adjustment of the effective length of the link 235, and the link can be releasably locked in any desired position of such adjustment as by means of a lock nut 240 threaded on the upper end of the stem portion 241 of the link and engaging a flat on the underside of the knuckle. This connection between the link and the knuckle, of course, will at times cause the upper countershaft to turn on its axis, in consequence of side-to-side tilting motion of the snow thrower unit, while the knuckle swings to a limited degree relative to the upper countershaft at such times as the snow thrower unit moves bodily up and down relative to the tractor.

The compression spring 243 of the link 235 is confined between the upper end of the tubular member and a second nut 244 on the threaded upper end of the stem portion, to exert a force on the link which tends to separate its two components in an endwise direction and thus push upwardly upon the upper countershaft 207, thereby maintaining good tension upon the drive belt 217 which encircles the pulleys 211 and 198.

The other expansion link, generally designated 246, is similar to that just described and is connected between the upper countershaft 207 and the sleeve 212 in which the lower countershaft rotates. In this case, the threaded stem portion 247 of the link 246 has its lower extremity welded or otherwise secured to the medial portion of the sleeve 212, while the tubular upper member 248 of the expansion link is secured at its upper end to a short sleeve 249 in which the rear end portion of the upper countershaft 207 is rotatably received. By suitable adjustment of the spring force exerted in opposite directions upon the upper and lower countershafts by the expansion link 246, the belt 216 drivingly connecting the output pulley 209 of the lower countershaft with the input pulley 210 of the upper countershaft is maintained under suitable tension.

As may be seen from FIGURE 9, the sleeve 236 to which the expansion link 236 connects is held against axial motion relative to the rotor drive shaft 197 by reason of the fact that the sleeve 236 is confined endwise between the input pulley 198 on the rotor drive shaft and the inner end of a tubular bearing 250 for the rotor drive shaft. The bearing 250 is in turn secured, as by welding, to a bracket 250' fixed on the housing of the snow thrower unit. The sprocket 196 is fixed on the shaft 197 at the end of the bearing 250 which is remote from the sleeve 236.

Whenever the snow thrower unit 141 is lifted upwardly by passage of one or both of its shoes 200 over packed snow or ice, the expansion link 235 is lifted with the unit to carry the upper countershaft 207 upwardly a distance corresponding to the extent the snow thrower was lifted. Since the unit, in effect, swings up and down in an arc about the axis of the pins 202 to which the rear ends of the push bars 201 are connected, the lower end of the expansion link 235 has a slight fore-and-aft swinging motion imparted to it in consequence of such up-and-down movement, and this swinging movement of the expansion link relative to the countershaft 207 is accommodated by the pivotal connection of the knuckle 237 to said countershaft.

As the upper countershaft 207 is moved upwardly by rising motion of the snow thrower unit, transmitted to the countershaft by the expansion link 235, the lower countershaft 206 is caused to move upwardly with it, primarily because of the connection therewith afforded by the belt 216. In thus traveling upwardly, the lower countershaft is compelled to swing in an arm about the axis of the engine crankshaft, in a counterclockwise direction as seen in FIGURE 9, due to the suspension of the lower countershaft 206 from the now rigid triangle provided by the overcenter linkage. Despite the fact that both the upper and lower countershafts will move up and down with the up-and-down "floating" action of the snow thrower unit, good tension will at all times be maintained upon the belt 215 by reason of the overcenter linkage connection between the crankshaft and the lower countershaft 206, while the belt 216 is maintained under tension by the expansion spring forming part of the spring loaded expansion link 246, and the belt 217 is similarly maintained under tension under the influence of expansion link 235.

Because the snow thrower unit 141 must be supported from the front of the tractor to move up and down relative thereto as well as to travel therewith during snow removal operations, the implement lift lever 126 must be in the position at which the dog on its latch lever cannot engage in the forward notch 232 of the sector-like plate 234 when the snow thrower unit is being used, but the lift lever can nevertheless be employed to move the snow thrower unit bodily upwardly to an inoperative or transmit position in which it may be releasably held by the engagement of the dog on the free end of the latch lever 130 in the rear notch 133 of the sector plate. The snow thrower unit, when so latched in its elevated position, can be very advantageously used to clear snow that has drifted into large banks or piles.

FIGURE 13 illustrates the manner in which the power unit or tractor of this invention can be converted to a power driven mowing device by the attachment to the tractor of a sickle bar mower generally designated 280. The sickle bar therein shown comprises an elongated cutting bar which includes a guide 282 and a blade 283 having a series of forwardly converging tooth-like cutters 284 thereon. The blade, of course, is mounted on the guide for reciprocatory motion along the length of the latter, in directions normal to the longitudinal axis of the tractor. In generally conventional fashion, the cutting bar of the mower is supported by a number of shoes, there being a wide and more or less flat shoe 286 at the inner end of the bar and two or more narrower shoes 287 outwardly of the shoe 286, one of which is located at the extreme outer end of the bar.

The cutting bar of the mower is coupled to the tractor, to travel therewith, by frame means which comprises an inboard frame section 288 and an outboard frame section 289, the outboard frame section being hingedly connected to the inboard frame section in a manner to be described shortly. The inboard frame section 288 comprises a framework fabricated of metal bars and which includes opposite side bars 290 and 291 that have their forward extremities pivotally connected, as at 292, with the front axle of the tractor by means of the same transversely extending pivot pin connections as are provided for the snow thrower unit. Since these pins are located beneath the downwardly offset forward end portion of the channel-shaped main frame member, the two arms 290 and 291 are likewise disposed beneath the main frame of the tractor and extend rearwardly therebeneath, but they are also inclined outwardly toward the right side of the tractor, from which the arm of the sickle bar mower projects. The rear end portions of the two arms 290 and 291 are bent laterally outwardly, so that they extend substantially parallel to the axes of the tractor wheel axles, and they are contiguous to one another to provide, in effect, a single laterally projecting arm 294. Another arm 295, which is parallel to but forwardly of the arm 294 and is rigidly secured to the outer frame arm 290 a short distance behind the front right wheel, cooperates with the arm 294 to provide for the support of a longitudinally extending hinge pin 296, the axis of which is substantially in line with the right front wheel.

The outboard frame section 289, which may be in the form of a casting, is hingedly supported on the hinge pin 296 for up-and-down swinging motion, and it, in turn, has a vertical pivot pin 298 affixed therein and depending therefrom on which the inner end of the cutting bar is mounted for horizontal swinging motion between an operative position, shown in FIGURE 13, and a rearwardly retracted position toward which the cutting bar can travel in the event it encounters an obstruction, such as a rock, a boulder or even a tree. The cutting bar is normally held in its operative position, extending transversely out from the righthand side of the tractor, by means of a latching device, generally designated 300, which comprises a forwardly projecting arm 301 on the inner or pivoted end of the cutting bar having a vertical pin 302 fixed in its front extremity. A keeper 303 which cooperates with the latch arm 301 is pivoted, as at 304, on a portion of the outboard frame section to swing about a vertical axis toward and from a locking position at which the pin 302 in the outer end of the latch arm is engaged in a notch 305 in the adjacent side edge of the keeper. The keeper 303 is normally held in its locking position by means of a strong tension spring 306 which is connected at one end to the keeper and at its other end to an adjustable eye 307 fastened to a portion of the outboard frame section. The spring 306 allows the keeper to swing forwardly and permit the pin 302 to be cammed out of the notch 305 in the event the cutting bar encounters an obstruction which might damage the mower, and the cutting bar can then swing rearwardly to a position at which it clears the obstruction.

From the description thus far it will be apparent that the pivoted connection 292 of the inboard frame section 288 with the front axle of the tractor allows the inboard section to swing up and down relative to the tractor chassis about a transverse axis parallel to and slightly behind the front axle but beneath the main frame member of the chassis. As the inboard frame section swings up and down, the upright hinge pin 296 on its laterally projecting rear end portion is of course carried up and down with it. Provision for such up-and-down motion of the cutting bar 282 is important because the cutting bar may be considered to be self-supporting by reason of the engagement of its shoes with the surface being mowed, and whenever the shoes travel over irregular ground they cause the arm to move up and down in a manner which is translated into up-and-down swinging motion of the inboard frame section 288 about its pivots 292.

It will also be noted that the hinge connection between the inboard and outboard frame sections allows the cutting arm to swing up and down about the axis of the hinge pin 296 as the arm encounters uneven ground during mowing, without in any wise disturbing the position of the inboard frame section 288.

The outboard frame section 289 also carries an input shaft 309 which is journaled in a rearward portion 310 of the outboard frame section for rotation on an axis coincident with that of the hinge pin 296. An input pulley 311 is mounted on the input shaft 309, directly behind the rear extremity of the hinge pin 296, and a V-belt 312 is trained around said input pulley and an output pulley 313 on the same power take-off shaft 81 that is provided for driving a rotary lawn mower such as is mentioned hereinbefore. The intermediate portions of the belt 312 are trained about idler means 314 comprising an upper and a lower idler pulley, one for each stretch of the belt 312. The idler pulleys are freely rotatably carried in a belt guard housing 315 for rotation on a generally upright axis which disposes the idler pulleys in a position such that the belt stretches extend straight forwardly from the output pulley 313 and straight sidewardly to the input pulley 311. The belt guard housing 315 extends around all sides of the belt adjacent to the idler pulleys, but is open at its rear, and it has an arm 316 thereon which projects more or less forwardly from the housing, adjacent to the idler pulleys, to receive a hinge pin 317 which is carried by a rearwardly projecting U-shaped bracket 318 fixed to a rear portion of the inner arm 291 of the inboard frame section 288. The axis of the hinge pin 317 is generally horizontal, and it accommodates a slight degree of movement of the belt guard housing 315 such as might take place whenever the frame sections supporting the cutting bar move up and down in unison at their hinge connection 296, in which event the input pulley 311 of the mower will likewise move up and down and will transmit similar up-and-down motion to the belt guard by reason of the tension of the stretches of the belt on the idler pulleys carried by the housing.

By reason of the above described location of the idler means 314 the effectiveness of the belt drive to the input pulley 311 is maintained at all times, despite hinging motion of the outboard frame section such as takes place during raising and lowering of the sickle bar between its operative and transit positions, or as results from the bar riding over uneven terrain.

When rotation is transmitted to the input shaft 309 from the power take-off shaft 81 of the tractor in the manner described, an eccentric 320 fixed to the rear of the input shaft 309 transmits reciprocatory movement to the cutting blade 283 through a medially pivoted lever 321 which is carried by the outboard section of the frame. A link 322 connects the eccentric with the rear end of the lever 321, and another link 323 connects the forward end of the lever wtih the cutting blade. Consequently, whenever the input belt 87 for the power take-off shaft 81 is tightened into driving relationship with the pulley 86, the cutting blade 283 of the mower is rapidly reciprocated to perform its cutting function in a conventional fashion.

Inasmuch as there might be times when the inner shoe 286 encounters a depression which might allow the inboard frame section 288 to swing downwardly and carry the input pulley 311 toward and into the ground, such an occurrence is guarded against by the expedient of connecting a chain 325 between one side of the channel-shaped main frame member and the outboard frame section as at 326. The chain should of course be of such length that it will at all times prevent the hinged-together inboard and outboard fame sections from swinging bodily downwardly to where the input pulley 311 is below a safe elevation above the ground over which the tractor is traveling.

The hinge 296 about which the outboard frame section can swing also enables the cutting bar of the mower to be tilted to a vertical or past-vertical transit position, and for this purpose an elongated handle 328 is affixed to the outboard frame section, as at 329, with the handle projecting upwardly and outwardly therefrom but located where it will be within easy grasp of an operator occupying the seat of the tractor.

It will be observed that the sickle bar mower is very simply removed from the tractor by disconnecting the two hinge pins at their connection 292 with the front axle and by detaching the chain 325 at its connection 326 with the outboard frame section 289. The belt 312, of course, is also easily removable from the output pulley 313 on the power take-off shaft 81.

From the foregoing description, taken together with the accompanying drawings, it will be readily apparent to those skilled in the art that this invention fulfills a long felt need in that it provides a power operated implement which is ideally suited for gardening, small scale farming and other tasks, and which comprises any of a number of attachments having rotatable or otherwise movable work-performing elements, and an improved power unit or tractor to which the attachments may be readily coupled, and which tractor features power take-off means at several locations thereon, from selected ones of which the rotatable or otherwise movable work-performing elements of the various attachments may be driven in a manner permitting bodily movement of the attachments relative to the tractor without disruption of the driving connection to their work-performing elements.

What is claimed as my invention is:

1. In a tractor: a chassis including front and rear axles, wheels at the ends of said axles, and a frame structure extending longitudinally between and connecting said axles, the front portion of said frame structure comprising a single channel shaped main frame member which extends rearwardly from the front axle and has an elevated horizontal portion intermediate the wheels of the tractor, said mean frame member having a web, and flanges which project upwardly from the web along the opposite longitudinal edges of the frame member and which flanges diverge toward the front of the tractor so that the web connecting the flanges has greatest width at the front of the frame structure; means connecting the front axle with the web of the frame member for pivotal motion relative thereto about a longitudinal axis disposed beneath the front of the frame member; an internal combustion engine providing the power source of the tractor, said engine having a cylinder, a crankshaft, and a flywheel impeller driven from one end of the crankshaft to flow cooling air over the cylinder from one side thereof; means mounting the engine in the channel shaped front of the frame member, on its web and between the flanges thereof, with its crank shaft disposed longitudinally and horizontally in line with the space between the flanges on the elevated intermediate portion of the frame member, and its flywheel impeller rearmost so as to blow cooling air forwardly over the cylinder; means to drivingly couple the engine with the rear wheels, including an elongated torque shaft lengthwise received in the channel shaped intermediate portion of the frame member and coupled at its forward end to the flywheel impeller; and cover means secured over the elevated portion of the frame member and cooperating with the web and flanges thereof to provide an enclosure in which the torque shaft is received.

2. In a tractor: a chassis including front and rear axles, wheels at the ends of the axles, and a frame structure extending longitudinally between and connecting said axles; an internal combustion engine providing the power source for the tractor and having a crankshaft; means mounting the engine on the front of the frame structure with its crankshaft extending longitudinally of the tractor and with one end thereof projecting forwardly from the engine to provide a first power take-off; a drive shaft mounted on the rear portion of the frame structure for rotation about a tansverse axis, and having one end thereof projecting laterally from the frame structure to afford a second power take-off; means including an elongated torque shaft at all times drivingly connecting said drive shaft with the other end of the engine crankshaft, whereby said first and second power take-offs are operative whenever the engine is in operation; transmission means on the rear of the tractor having a transverse input shaft and gearing drivingly connecting the same with the rear axle; means for drivingly connecting the transmission input shaft with said transverse drive shaft; manually actuatable means on the tractor controlling the operativeness of said last named driving connection; a first implement drive member mounted on the rear of the frame structure for rotation on a transverse axis above and rearwardly of the rear axle; a second implement drive member carried by the frame structure for rotation on a transverse axis for-wardly of the rear axle and beneath the frame structure; means for drivingly connecting each of said drive members with said transverse drive shaft so as to enable them to be driven independently of the transmission means whenever the engine is in operation; and manually actuatable means on the tractor controlling the operativeness of each of said last named driving connections.

3. In a tractor: a chassis including front and rear axles, wheels at the opposite ends of the axles, and a frame structure extending longitudinally between and connecting said axles, said frame structure comprising a single elongated frame member providing the front portion of the frame structure; transmission means at the rear of the tractor, said transmission means including a housing supported on the rear axle and having said frame member secured thereto so that the housing provides a rear portion of said frame structure, and having a transverse input shaft located near the rear axle, and a gear train in the housing to drivingly connect the input shaft with the rear axle; a drive shaft mounted on the rear portion of the frame structure for rotation about a transverse axis spaced forwardly from the transmission input shaft; an internal combustion engine providing the power source for the tractor and having a crankshaft; means mounting the engine on the front of said frame member above the front axle, with the crank shaft of the engine extending longitudinally of the tractor; means including an elongated longitudinally extending power shaft at all times drivingly connecting the crankshaft with said transverse drive shaft; power takeoff means on said drive shaft from which an implement attached to the tractor can be power driven; means for drivingly connecting the transmission input shaft with said transverse drive shaft; manually actuatable means on the tractor controlling the operativeness of said last named driving connection; an implement drive shaft mounted on the rear of the frame structure for rotation on a transverse axis fixed with respect to the frame structure and behind the rear axle, to provide for transmission of torque to an input shaft of an implement that may be attached to the rear of the tractor; an implement attaching bracket carried by the rear of the frame structure for locking movement about the axis of said implement drive shaft and to which an implement behind the tractor can be secured so as to be supported by the tractor for bodily up and down motion relative to the tractor; and means on the tractor to drivingly connect said implement drive shaft with the transverse drive shaft independently of the transmission means, including a single manually actuatable mechanism for effecting disconnection of said implement drive shaft from the transverse drive shaft.

4. The tractor of claim 3, wherein said frame member provides an enclosure extending rearwardly from the engine in which the longitudinally extending power shaft is received.

5. The tractor of claim 3, further characterized by a drum on said transverse drive shaft around which a rope may be wound to enable the engine to be started from a location adjacent to the rear axle of the tractor.

6. The tractor of claim 3, further characterized by an implement lift hand lever pivotally mounted on the frame structure a distance forwardly of the rear axle; and means linking said hand lever with the implement attaching bracket so that the latter may be rocked back and forth about its axis by the hand lever.

7. The tractor of claim 6, further characterized by: a seat for the driver of the tractor; means supporting the seat on the frame structure at a location over said transmission means; fenders fixed to the opposite sides of the seat and overlying upper portions of the rear wheels, said seat and fenders serving as a guard over the transverse drive shaft and its driving connection with the transmission input shaft; and means pivotally connecting the rear of the seat to the rear of the frame structure to enable the seat and the fenders thereon to be swung upwardly and rearwardly to an inoperative position affording access to said transverse drive shaft and its driving connection with the transmission input shaft.

References Cited by the Examiner

UNITED STATES PATENTS

| | | | |
|---|---|---|---|
| 537,634 | 4/95 | Davis. | |
| 574,578 | 1/97 | Sattley et al. | |
| 773,989 | 11/04 | Sammer | 56—25 |
| 800,082 | 9/05 | De Freese. | |
| 1,214,545 | 2/17 | Hastings | 75—25 |
| 1,289,884 | 12/18 | Opalka | 172—117 X |
| 1,320,535 | 11/19 | Dennert | 180—64 |
| 1,428,713 | 9/22 | Schoenhard | 180—64 |
| 1,509,293 | 9/24 | Hart | 180—90 X |
| 1,529,579 | 3/25 | Dorsey | 180—53 X |
| 1,868,770 | 7/32 | See | 180—53 |
| 1,933,539 | 11/33 | Brown et al. | 180—53 |
| 2,001,029 | 5/35 | Kulick et al. | 180—54 X |
| 2,035,212 | 3/36 | Alborn | 180—54 |
| 2,066,666 | 1/37 | Becker | 180—1.5 X |
| 2,294,945 | 9/42 | Zink | 180—54.2 |
| 2,399,733 | 5/46 | Hagen | 180—53 |
| 2,404,442 | 7/46 | Hutchings | 180—1.5 |
| 2,434,759 | 1/48 | Donovan | 180—25 X |
| 2,526,396 | 10/50 | Nowlin | 172—47 |
| 2,549,524 | 4/51 | Rich | 280—111 X |
| 2,581,535 | 1/52 | Jackson | 175—184 |
| 2,657,621 | 11/53 | Kantz et al. | 180—25 X |
| 2,736,112 | 2/56 | Boissonnault | 37—43 |
| 2,779,112 | 1/57 | Garland | 37—43 |
| 2,868,305 | 1/59 | Surratt | 172—47 |
| 2,879,859 | 3/59 | Swisher | 180—26 |
| 2,890,860 | 6/59 | Smith | 175—184 |
| 2,915,133 | 12/59 | Kraus | 180—54 X |

FOREIGN PATENTS 921,172    1/47    France.

ABRAHAM G. STONE, *Primary Examiner.*

A. JOSEPH GOLDBERG, *Examiner.*

UNITED STATES PATENT OFFICE
CERTIFICATE OF CORRECTION

Patent No. 3,187,821

June 8, 1965

Igor Kamlukin

It is hereby certified that error appears in the above numbered patent requiring correction and that the said Letters Patent should read as corrected below.

Column 1, line 27, for "purposes" read -- purpose --; line 53, for "it" read -- its --; column 3, line 64, for "as" read -- is --; column 6, line 66, for "Igor Kamulkin" read -- Igor Kamlukin --; column 11, line 8, for "secor" read -- sector --; lines 21 and 22, for "beltitghtening" read -- belt-tightening --; column 15, line 72, for "236" read -- 235 --; column 16, line 27, for "arm" read -- arc --; lines 50 and 51, for "transmit" read -- transit --; column 18, line 71, for "fame" read -- frame --; column 19, line 36, for "mamber" read -- member --; line 39, for "mean" read -- main --; column 20, lines 17 and 18, for "for-wardly" read -- forwardly --; line 59, for "locking" read -- rocking --.

Signed and sealed this 7th day of December 1965.

(SEAL)
Attest:

ERNEST W. SWIDER
Attesting Officer

EDWARD J. BRENNER
Commissioner of Patents